US010563984B2

(12) United States Patent
Tracy et al.

(10) Patent No.: US 10,563,984 B2
(45) Date of Patent: Feb. 18, 2020

(54) METHOD AND DEVICE FOR DETERMINING ROTATIONAL RATE

(71) Applicant: Moog Inc., East Aurora, NY (US)

(72) Inventors: Michael Tracy, Coto de Caza, CA (US); Martin Turon, Berkeley, CA (US); Derek Tat, Monterey Park, CA (US)

(73) Assignee: Moog Inc., East Aurora, NY (US)

( * ) Notice: Subject to any disclaimer, the term of this patent is extended or adjusted under 35 U.S.C. 154(b) by 12 days.

(21) Appl. No.: 16/071,531

(22) PCT Filed: Jan. 20, 2017

(86) PCT No.: PCT/US2017/014443
§ 371 (c)(1),
(2) Date: Jul. 20, 2018

(87) PCT Pub. No.: WO2017/127751
PCT Pub. Date: Jul. 27, 2017

(65) Prior Publication Data
US 2019/0078885 A1    Mar. 14, 2019

Related U.S. Application Data

(60) Provisional application No. 62/280,730, filed on Jan. 20, 2016.

(51) Int. Cl.
*G01C 19/5691* (2012.01)
*G01C 19/5677* (2012.01)
*G01C 19/5776* (2012.01)

(52) U.S. Cl.
CPC ..... *G01C 19/5691* (2013.01); *G01C 19/5677* (2013.01); *G01C 19/5776* (2013.01)

(58) Field of Classification Search
CPC ............ G01C 19/5677; G01C 19/5684; G01C 19/5691; G01C 19/567; G01C 19/5776
See application file for complete search history.

(56) References Cited

U.S. PATENT DOCUMENTS 5,383,362 A * 1/1995 Putty ................. G01C 19/5677
                                                    73/504.01
6,065,340 A * 5/2000 Matthews .......... G01C 19/5691
                                                    73/504.13

(Continued)

*Primary Examiner* — Nathaniel J Kolb
(74) *Attorney, Agent, or Firm* — Hodgson Russ LLP

(57) ABSTRACT

An angular rate sensor has a ring, a plurality of sensor-drivers, circuitry, a controller, an energy sensor, and an output signal generator. The sensors-drivers may be capacitors, inductors, or a sensor having a piezoelectric material. The sensor-drivers each have a component that vibrates along with the ring, and the sensor-drivers are arranged in cooperating sets, each cooperating set having two sensor-drivers positioned 180° apart. The circuitry can selectively engage some of the cooperating sets as sensors and others of the cooperating sets as drivers. Those sets used as sensors sense motion of the ring. Those sets used as drivers apply forces to the ring. Some of the drivers cause the ring to vibrate at its natural frequency, and some of the drivers seek to inhibit motion of the ring at particular locations. Locations at which drivers seek to inhibit motion are those locations that would be nodes in the absence of angular motion.

52 Claims, 21 Drawing Sheets

(56) References Cited

U.S. PATENT DOCUMENTS

| | | | | |
|---|---|---|---|---|
| 6,305,222 B1* | 10/2001 | Johnson | ............. | G01C 19/5684 |
| | | | | 73/504.12 |
| 6,848,305 B2* | 2/2005 | Fell | ................... | G01C 19/5684 |
| | | | | 73/504.13 |
| 8,056,413 B2* | 11/2011 | Yazdi | ................. | G01C 19/5684 |
| | | | | 73/504.13 |
| 8,825,436 B2* | 9/2014 | Zhang | ..................... | G01P 15/08 |
| | | | | 702/141 |
| 2006/0248953 A1* | 11/2006 | Lynch | .................... | G01C 19/02 |
| | | | | 73/504.12 |

* cited by examiner

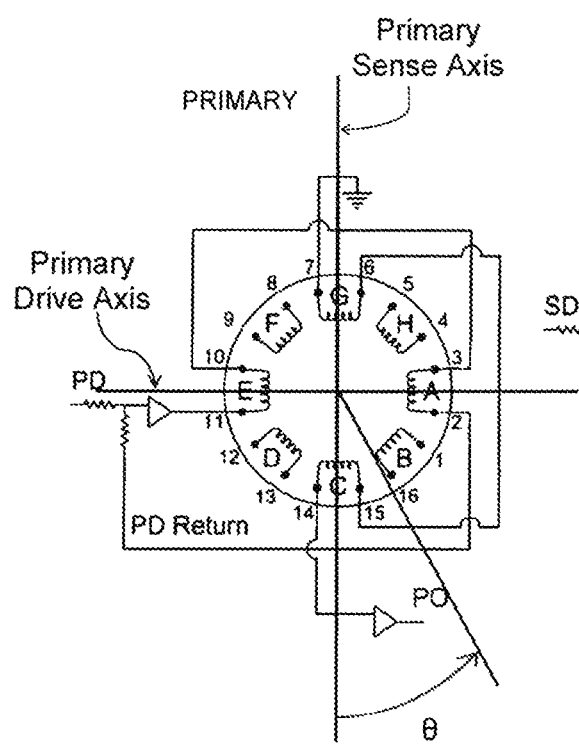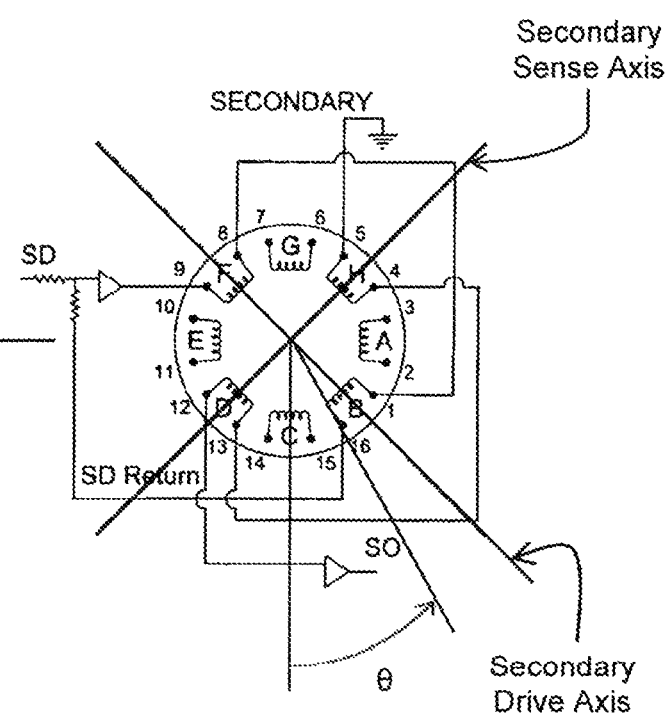
Fig. 8A
Fig. 8B

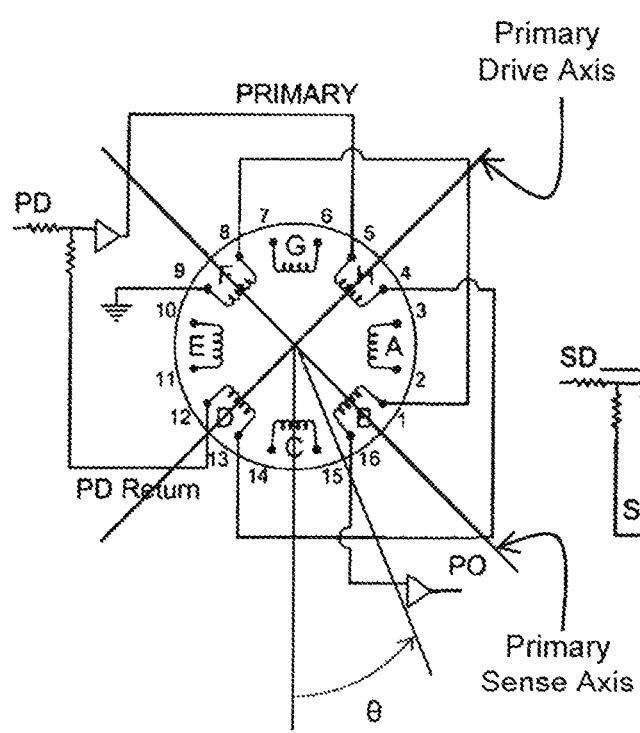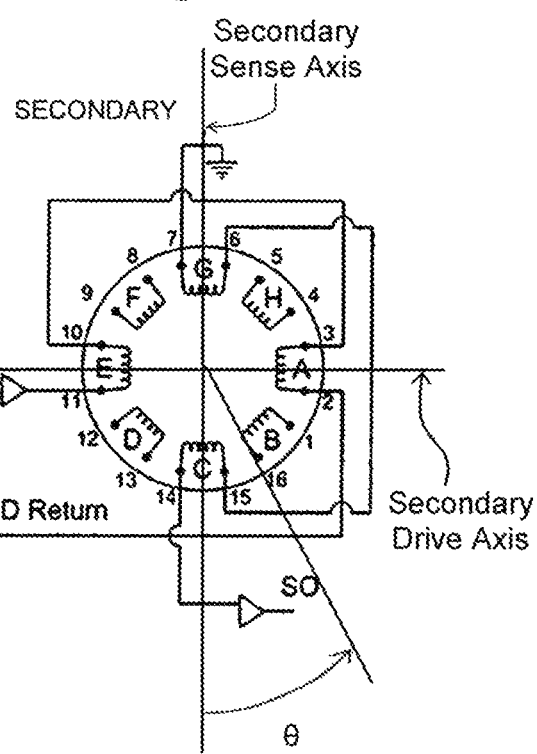
Fig. 9A
Fig. 9B

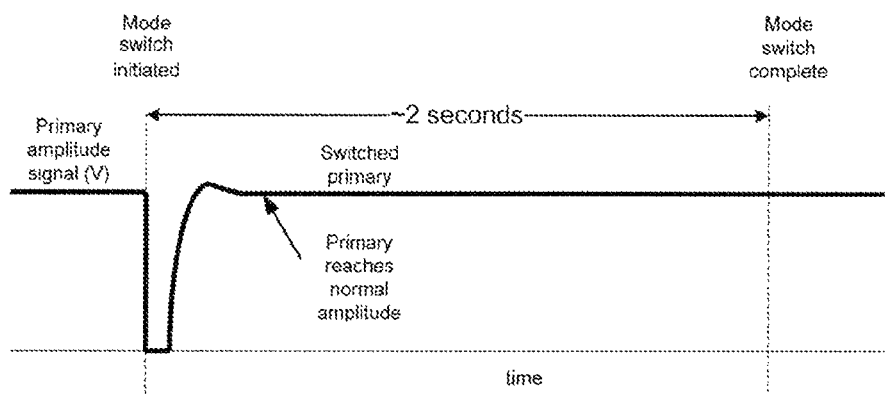
Fig. 16A-1
Fig. 16A-2
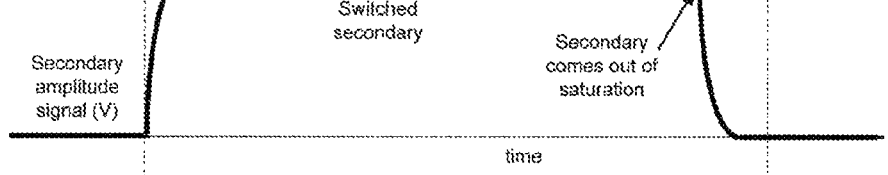
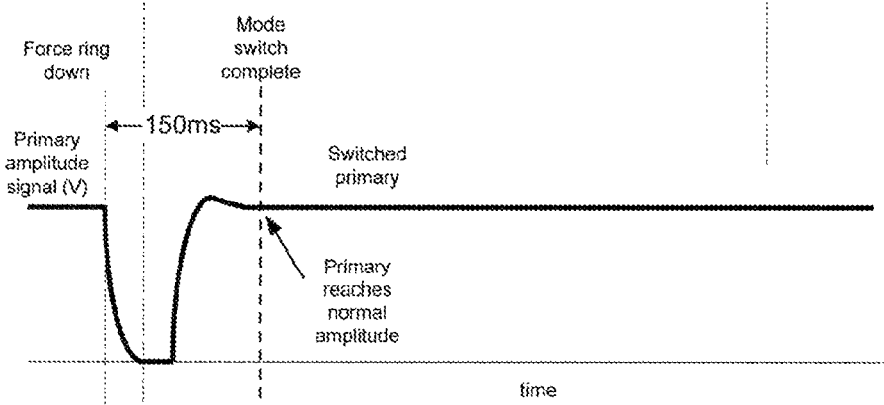
Fig. 16B-1
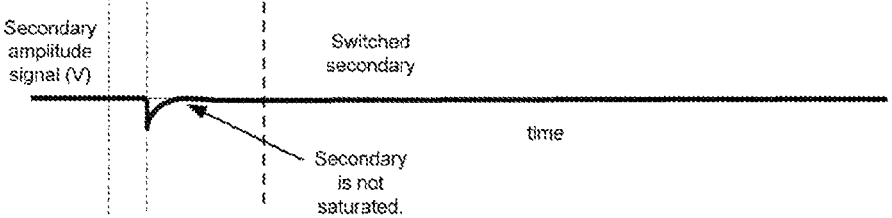
Fig. 16B-2

Bias correction voltages are set to minimize sensor sensitivity to temperature

After calibration, a compensation network maybe be added to further reduce sensor sensitivity to temperature.

METHOD AND DEVICE FOR DETERMINING ROTATIONAL RATE

CROSS-REFERENCE TO RELATED APPLICATION

This application claims the benefit of priority to U.S. provisional patent application Ser. No. 62/280,730, filed on Jan. 20, 2016, which is incorporated herein by reference.

FIELD OF THE INVENTION

The present invention relates to devices/systems/methods of determining a rate of rotation.

BACKGROUND OF THE INVENTION

Angular rate measurement systems are used in many situations where it is useful to measure and determine a rate of rotation. For example, an angular rate measurement system may be useful for determining the rate of rotation of a vehicle, such as an airplane, truck, or car for purposes of determining the direction in which the vehicle is heading. Or, an angular rate measurement system may be useful for determining the rate of rotation of a cell phone which is being carried by such a vehicle. Such angular rate information may be used in a vehicle stability control system, navigation system, or elsewhere. For some angular rate measurement systems, the ability to accurately determine the angular rate is very important.

Many applications will use angular rate information in order to find a heading. For example, many military applications use an angular rate measurement system to find a heading (e.g. North), and that heading may then be used to control a missile or drone. If the heading is not accurately determined, such military vehicles may not arrive at the desired destination, which may result in unwanted and serious consequences.

Sensor bias errors, which are sometimes referred to as "offset errors", are one type of error that can lead to a reduction in accuracy, particularly because sensor bias errors can accumulate and grow as signals derived from the angular rate information are processed, and thereby result in erroneous determinations. In order to provide accurate information, it is important to minimize or eliminate these bias errors (a.k.a. offset errors) so that the measurement system can be relied upon, for example, to find the heading of a vehicle to within a fraction of a degree.

SUMMARY OF THE INVENTION

The invention may be embodied as an angular rate sensor having a ring, a plurality of sensor-drivers, circuitry, a controller, an energy sensor, and an output signal generator. Some or all of the sensors-drivers may be capacitors, inductors, or a sensor having a piezoelectric material. Each of the sensor-drivers has a component that moves with the ring, and the sensor-drivers are arranged in cooperating sets, each cooperating set having two sensor-drivers positioned 180° apart. The circuitry can selectively engage some of the cooperating sets as sensors and others of the cooperating sets as drivers.

In angular rate sensors that are in keeping with the invention, the energy sensor may be used to determine two energy values, each corresponding to a different period of time. The determined energy values are each a measure of the energy needed to resist motion of the vibrating ring in locations where nodes would exist in the absence of angular motion. One or more of the energy values may be a voltage. For example, in one embodiment of the invention, four cooperating sets of sensor-drivers are used, and during a first period of time ("fpt"), the energy value may be measured using one of the cooperating sets, and during a second period of time ("spt"), the energy value may be measured using another of the cooperating sets.

Using the output signal generator, an energy difference may be determined. The energy difference may be the difference between the fpt energy value and the spt energy value. The energy difference may be used to identify an angular rate of rotation (for example, via a look-up table) corresponding to the energy difference. As an example, the output signal generator may determine an energy difference by subtracting the spt energy value from the fpt energy value, or vice versa. From that energy difference, a corresponding angular rate of rotation may be determined. An output signal identifying the angular rate of rotation may be provided by the output signal generator. That output signal may be provided and used, for example, to determine a direction in which the sensor is heading.

In an embodiment of the angular rate sensor, during a first period of time ("fpt"), the controller:
 (a-i) engages a first of the cooperating sets to radially apply forces to the ring in order to cause the ring to vibrate at a natural frequency that would establish at least four node locations in the absence of angular motion, each node location being a location at which the vibrating ring does not move radially in the absence of angular motion;
 (a-ii) engages a second of the cooperating sets to sense radial movement of the ring caused by the first cooperating set radially driving the ring;
 (a-iii) engages a third of the cooperating sets to sense radial movement of the ring at a first two of the node locations;
 (a-iv) engages a fourth of the cooperating sets to radially apply forces to the ring in order to reduce motion detected by the third cooperating set. For example, during the fpt the fourth cooperating set may apply forces to the ring at locations where a second two nodes should be if no angular motion is present.

During a second period of time ("spt") the controller:
 (b-i) engages either the third cooperating set or the first cooperating set to radially apply forces to the ring in order to cause the ring to vibrate at the natural frequency;
 (b-ii) engages either the fourth cooperating set (if the third cooperating set is engaged under (b-i) above) or the second cooperating set (if the first cooperating set is engaged under (b-i) above) to sense radial movement of the ring caused by the third or first cooperating set (as the case may be) radially driving the ring;
 (b-iii) engages either the second cooperating set (if the third cooperating set is engaged under (b-i) above) or the fourth cooperating set (if the first cooperating set is engaged under (b-i) above) to sense radial movement of the ring at two of the node locations;
 (b-iv) engages either the first cooperating set (if the third cooperating set is engaged under (b)(i) above) or the third cooperating set (if the first cooperating set is engaged under (b-i) above) to radially apply forces to the ring in order to reduce motion detected by the second cooperating set (if the third cooperating set is engaged under (b-i) above) or the fourth cooperating set (if the first cooperating set is engaged under (b-i)

above), as the case may be. For example, during the spt the forces applied pursuant to this step (b-iv) may be applied to the ring at locations where a second two nodes should be if no angular motion is present.

For example, during the spt, the controller may:
(i) engage the third cooperating set under step (b-i);
(ii) engage the fourth cooperating set under step (b-ii);
(iii) engage the second cooperating set under step (b-iii);
(iv) engage the first cooperating set under step (b-iv); and
between the fpt and the spt, the controller connects the first cooperating set to a ground-reference voltage so that radial movement of the ring is reduced.

The energy sensor may be in communication with the cooperating sets, and the energy sensor determines an fpt energy value and an spt energy value. The fpt energy value may be measured via the fourth cooperating set, and the spt energy value may be measured via the first cooperating set (if the third cooperating set is engaged under (b-i) above) or the third cooperating set (if the first cooperating set is engaged under (b-i) above).

The output signal generator may be in communication with the energy sensor, and the output signal generator may determine an energy difference between the fpt energy value and the spt energy value, and then identifies an angular rate of rotation corresponding to the energy, difference. As an example, the output signal generator may determine an energy difference by subtracting the spt energy value from the fpt energy value, or vice versa. One or more of the energy values may be voltages. An output signal identifying the angular rate of rotation may be provided by the output signal generator. That output signal may be provided and used, for example, to determine a direction in which the sensor is heading.

An angular rate sensor according to the invention may be configured so that (a) the first cooperating set and the second cooperating set are positioned with regard to the ring in order to be offset from each other by 90°, and (b) the third cooperating set and the fourth cooperating set are positioned with regard to the ring in order to be offset from each other by 90°, and (c) the first cooperating set and the fourth cooperating set may be positioned with regard to the ring in order to be offset from each other by 45°.

The output signals from one or more of the cooperating sets may be adjusted by a bias correction voltage in order to reduce effects caused by temperature, rather than the effects caused by the angular motion. For example, with regard to the embodiment described above, a voltage signal produced by the second cooperating set during the fpt may be adjusted by a bias correction voltage, and/or a voltage signal produced by the fourth cooperating set during the spt may be adjusted by a bias correction voltage. The bias correction voltage may be selected to be equal to a voltage which causes the energy difference to be equal to zero when no externally applied rate is applied to the sensor.

In an alternate embodiment of the invention, during the spt, the controller:
(i) engages the first cooperating set under step (b)(i);
(ii) engages the second cooperating set under step (b)(ii);
(iii) engages the fourth cooperating set under step (b)(iii); and
(iv) engages the third cooperating set under step (b)(iv).

Such an embodiment of the angular rate sensor may be configured so that (a) the first cooperating set and the second cooperating set are positioned with regard to the ring in order to be offset from each other by 90°, and (b) the third cooperating set and the fourth cooperating set are disposed on the ring to be offset from each other by 90°, and (c) the first cooperating set and the fourth cooperating set may be positioned with regard to the ring in order to be offset from each other by 45°.

With regard to the alternate embodiment described in the prior paragraph, the output signals from one or more of the cooperating sets may be adjusted by a bias correction voltage in order to reduce effects caused by temperature, rather than the effects caused by the angular motion. For example, with regard to the alternate embodiment described above, a voltage signal produced by the second cooperating set during the fpt may be adjusted by a bias correction voltage, and/or a voltage signal produced by the second cooperating set during the spt may be adjusted by a bias correction voltage. The bias correction voltage may be selected to be equal to a voltage which causes the energy difference to be equal to zero when no externally applied rate is applied to the sensor.

The invention may be embodied as a method of determining angular rate. Such a method may include providing an angular rate sensor. The angular rate sensor may have:
a ring;
a plurality of sensor-drivers, each sensor-driver having a component that move with the ring wherein the sensor-drivers are arranged in cooperating sets, and each cooperating set has two sensor-drivers positioned 180° apart;
circuitry which can selectively engage some of the cooperating sets as sensors and others of the cooperating sets as drivers;
a controller in communication with the circuitry, and that engages some of the sensor-drivers to sense radial movement of the ring and some of the sensor-drivers to apply forces to the ring;
an energy sensor in communication with the sensor-drivers via the circuitry that determines energy values using selected ones of the sensor-drivers; and
an output signal generator in communication with the energy sensor.

Some or all of the sensors-drivers may be capacitors; inductors, or a sensor having a piezoelectric material.

In methods according to the invention, the energy sensor may be used to determine two energy values, each corresponding to a different period of time. The determined energy values are each a measure of the energy needed to resist motion of the vibrating ring in locations where nodes would exist in the absence of angular motion. One or more of the energy values may be a voltage. For example, in one embodiment of the invention, four cooperating sets of sensor-drivers are used, and during a first period of time ("fpt"), the energy value may be measured using one of the cooperating sets, and during a second period of time ("spt"), the energy value may be measured using another of the cooperating sets.

Using the output signal generator, an energy difference may be determined. The energy difference may be the difference between the fpt energy value and the spt energy value. The energy difference may be used to identify an angular rate of rotation (for example, via a look-up table) corresponding to the energy difference. As an example, the output signal generator may determine an energy difference by subtracting the spt energy value from the fpt energy value, or vice versa. From that energy difference, a corresponding angular rate of rotation may be determined. An output signal identifying the angular rate of rotation may be provided by the output signal generator. That output signal may be provided and used, for example, to determine a direction in which the sensor is heading.

During a first period of time ("fpt"), the controller may be used to:
- (a-i) engage a first of the cooperating sets to radially apply forces to the ring in order to cause the ring to vibrate at a natural frequency that would establish at least four node locations in the absence of angular motion, each node location being a location at which the vibrating ring does not move radially in the absence of angular motion;
- (a-ii) engage a second of the cooperating sets to sense radial movement of the ring caused by the first cooperating set radially driving the ring;
- (a-iii) engage a third of the cooperating sets to sense radial movement of the ring at a first two of the node locations;
- (a-iv) engage a fourth of the cooperating sets to radially apply forces to the ring in order to reduce motion detected by the third cooperating set. For example, during the fpt the fourth cooperating set may apply forces to the ring at locations where a second two nodes should be if no angular motion is present.

During a second period of time ("spt"), the controller may be used to:
- (b-i) engage either the third cooperating set or the first cooperating set to radially apply forces to the ring in order to cause the ring to vibrate at the natural frequency;
- (b-ii) engage either the fourth cooperating set (if the third cooperating set is engaged under (b)(i) above) or the second cooperating set (if the first cooperating set is engaged under (b)(i) above) to sense radial movement of the ring caused by the third or first cooperating set (as the case may be) radially driving the ring;
- (b-iii) engage either the second cooperating set (if the third cooperating set is engaged under (b)(i) above) or the fourth cooperating set (if the first cooperating set is engaged under (b)(i) above) to sense radial movement of the ring at two of the node locations; and
- (b-iv) engage either the first cooperating set (if the third cooperating set is engaged under (b-i) above) or the third cooperating set (if the first cooperating set is engaged under (b-i) above) to radially apply forces to the ring in order to reduce motion detected by the second cooperating set (if the third cooperating set is engaged under (b-i) above) or the fourth cooperating set (if the first cooperating set is engaged under (b-i) above), as the case may be.

Using the energy sensor; an fpt energy value and an spt energy value may be determined. The fpt energy value may be measured by the fourth cooperating set, and the spt energy value may be measured by the first cooperating set (if the third cooperating set is engaged under (b-i) above) or the third cooperating set (if the first cooperating set is engaged under (b-i) above).

Using the output signal generator; an energy difference may be determined. The energy difference may be the difference between the fpt energy value and the spt energy value. The energy difference may be used to identify an angular rate of rotation corresponding to the energy difference. As an example; the output signal generator may determine an energy difference by subtracting the spt energy value from the fpt energy value, or vice versa. An output signal identifying the angular rate of rotation may be provided by the output signal generator. That output signal may be provided and used, for example, to determine a direction in which the sensor is heading.

In one embodiment of a method according to the invention, during the spt, the controller:
- (i) engages the third cooperating set under step (b-i);
- (ii) engages the fourth cooperating set under step (b-ii);
- (iii) engages the second cooperating set under step (b-iii);
- (iv) engages the first cooperating set under step (b-iv); and between the fpt and the spt, the controller connects the first cooperating set to a ground-reference voltage so that radial movement of the ring is reduced.

In such a method, the angular rate sensor may be configured so that (a) the first cooperating set and the second cooperating set are positioned with regard to the ring in order to be offset from each other by 90°, and (b) the third cooperating set and the fourth cooperating set are positioned with regard to the ring in order to be offset from each other by 90°, and (c) the first cooperating set and the fourth cooperating set are positioned with regard to the ring in order to be offset from each other by 45°.

With regard to the method summarized above, the output signals from one or more of the cooperating sets may be adjusted by a bias correction voltage in order to reduce effects caused by temperature, rather than the effects caused by the angular motion. For example, with regard to the embodiment described above, a voltage signal produced by the second cooperating set during the fpt may be adjusted by a bias correction voltage, and/or a voltage signal produced by the fourth cooperating set during the spt may be adjusted by a bias correction voltage. The bias correction voltage may be selected to be equal to a voltage which causes the energy difference to be equal to zero when no externally applied rate is applied to the sensor. The bias correction voltage may be selected to be equal to a voltage which causes the energy difference to be equal to zero when no externally applied rate is applied to the sensor.

In an alternate method according to the invention, during the spt, the controller:
- (i) engages the first cooperating set under step (b)(i);
- (ii) engages the second cooperating set under step (b)(ii);
- (iii) engages the fourth cooperating set under step (b)(iii);
- (iv) engages the third cooperating set under step (b)(iv).

In such an alternate method, the angular rate sensor may be configured so that (a) the first cooperating set and the second cooperating set are disposed on the ring to be offset from each other by 90°, and (b) the third cooperating set and the fourth cooperating set are disposed on the ring to be offset from each other by 90°, and (c) the first cooperating set and the fourth cooperating set are disposed on the ring to be offset from each other by 45°.

With regard to the alternate method summarized above, the output signals from one or more of the cooperating sets may be adjusted by a bias correction voltage in order to reduce effects caused by temperature, rather than the effects caused by the angular motion. For example, with regard to the embodiment described above, a voltage signal produced by the second cooperating set during the fpt may be adjusted by a bias correction voltage, and/or a voltage signal produced by the second cooperating set during the spt may be adjusted by a bias correction voltage. The bias correction voltage may be selected to be equal to a voltage which causes the energy difference to be equal to zero when no externally applied rate is applied to the sensor. The bias correction voltage may be selected to be equal to a voltage which causes the energy difference to be equal to zero when no externally applied rate is applied to the sensor.

BRIEF DESCRIPTION OF THE DRAWINGS

For a fuller understanding of the nature and objects of the invention, reference should be made to the accompanying drawings and the subsequent description. Briefly, the drawings are:

FIGS. 8A and 8B, which diagrammatically illustrate aspects of the angular rate sensor depicted in FIGS. 6 and 7, respectively, when the sensor is in a first operating configuration;

FIGS. 9A and 9B, which diagrammatically illustrate aspects of the angular rate sensor of FIGS. 8A and 8B when the sensor is in a second operating configuration;

FIGS. 16A-1 and 16A-2, which are plots, in which FIG. 16A-1 corresponds to the primary pick-off signals and FIG. 16A-2 corresponds to the secondary pick-off signals for a period of time that includes switching from one operating configuration to another operating configuration when there is no forced ring down;

FIGS. 16B-1 and 16B-2, which are plots, in which FIG. 16B-1 corresponds to the primary pick-off signals and FIG. 16B-2 corresponds to the secondary pick-off signals for a period of time that includes switching from one operating configuration to another operating configuration when there is forced ring down;

FURTHER DESCRIPTION OF THE INVENTION

Figure 1:
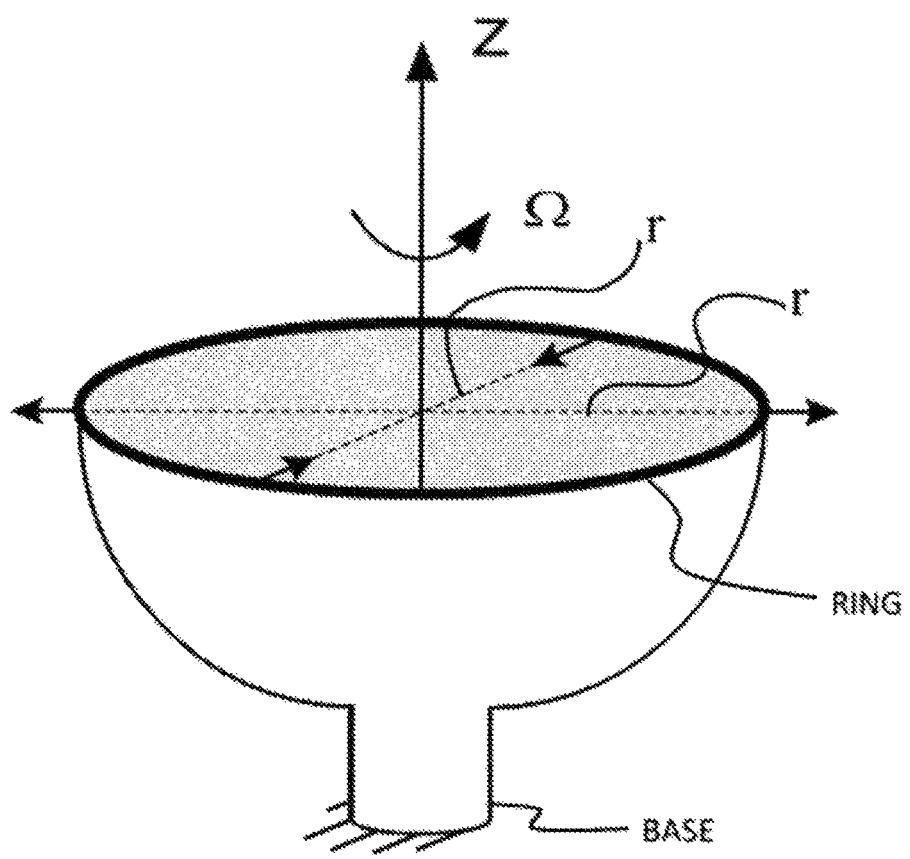
FIG. 1, which diagrammatically illustrates certain features of an angular rate measurement sensor for measuring an angular rate Ω of a base that supports a ring that is substantially free to vibrate in a radial direction r.

An angular rate sensor according to one embodiment of the invention operates on the "wine-glass" principle to detect angular rate. The name of this phenomenon derives from a situation in which the phenomenon was originally observed—with a wine glass. When the wine glass was struck, an audible standing-wave was created. By rotating the glass about its stem, it was heard that the standing wave rotated a fraction of the angle through which the glass was rotated.

An angular rate sensor operating on the "wine-glass" principle detects the angular position of a standing wave, and seeks to keep the standing wave in a desired stationary position. Measurements corresponding to the force that is needed to keep the wave in that desired stationary position are detected by the sensor, and those measurements are used to determine the rate at which the sensor is rotating. Toward that end, the angular rate sensor may be fabricated to have a base, a ring structure, and a means by which the ring structure may be caused to vibrate radially—that is to say caused to vibrate in the plane of the ring. The base may be fixed to an object, such as a package or vehicle, and that object serves as the inertia frame of interest. When the object rotates, so too does the base.

The ring structure is substantially free to vibrate in the radial direction, which is perpendicular to the axis about which rotation is measured. See FIG. 1. Forces applied to the ring establish a standing wave in the ring structure. If nothing is done to maintain the position of the standing wave when the base rotates, for example when the object is turning about the z-axis at an angular rate $\Omega$, the standing wave will rotate, but at a fraction of the angular rate $\Omega$. By maintaining the standing-wave while the ring is vibrating at its natural frequency and at a constant amplitude, and measuring the energy needed to maintain the desired stationary position of the standing wave, it is possible to indirectly measure the force required to hold the wave in position, and that force is proportional to the angular rate, $\Omega$.

In one embodiment of the invention, the angular rate sensor has the capability to operate in different configurations, so that the output signal voltage is positive in one operating configuration, and negative in another configuration. For example, in one operating configuration the sensor components will be electrically connected in a manner such that the measured angular rate will be $+\Omega$. However, in another operating configuration the sensor components will be electrically connected in a manner such that the measured angular rate will be $-\Omega$, even though rotation of the object has not changed in direction or magnitude. So, for a given angular rotation, the angular rate sensor has a first operating configuration and a second operating configuration, and the sign of the measured angular rate $\Omega$ will be different between the two operating configurations even though no change in the angular rate has occurred. Put simply, the angular rate signal measured by the sensor undergoing the same angular rate, will change sign as a result of changing from the first operating configuration to the second operating configuration, and vice versa. This sign change is not merely a change in the final output from the sensor electronics; the sign change results from a change in how the sensor detects the angular rate.

When switching from one operating configuration to another operating configuration, the devices used to detect angular rate and/or the connections between them are changed. That is to say that in one operating configuration, the collection of devices and/or electrical connections of devices used to detect angular rate are different than the collection of devices and/or electrical connections of devices used to detect angular rate in another operating configuration. For example, in a first operating configuration, a particular pair (the "first pair") of sensor-drivers may be used to maintain the location of stationary nodes of the vibrating ring. That is to say, when there is no rotation, there will be locations on the vibrating ring where the ring does not move, and these locations are referred to as "stationary nodes". When rotation is present, the locations of these stationary nodes move, according to the "wine glass" principle, unless forces are applied to prevent movement of the stationary nodes. In an angular rate sensor utilizing a vibrating ring, a pair of sensor-drivers may be used to apply forces to the vibrating ring so that the locations of the stationary nodes remain constant. And, the amount of force needed to keep the stationary nodes in their non-rotation locations, is proportional to the rate of rotation.

For example, electric energy may be supplied to the first pair of sensor-drivers in order to position the stationary nodes of the vibrating ring at the same location that the stationary nodes would be at when no rotation is present. The amount of electric energy needed to achieve that desired positioning of the stationary nodes is proportional to the angular rate of rotation. So, by monitoring the amount of electric energy supplied to the first pair, it is possible to determine the angular rate of rotation. In operation, the angular rate signal derived by measuring the force (or electric energy) needed to maintain the position of the stationary nodes (sometimes referred to herein as the "output signal") may be expressed as a voltage that is proportional to the sensor's rate of rotation $\Omega$. In a second operating configuration, a different pair (the "second pair") of sensor-drivers is used to keep the stationary nodes of the vibrating ring in the desired locations, and the electric energy supplied to this second pair is monitored so that the angular rate can be determined. In an ideal situation, the angular rate measured by using the first pair of sensor-drivers is identical to the angular rate measured by using the second pair of sensor-drivers. However, that ideal situation is rarely the case.

An output signal derived from the sensor-drivers and used to maintain the locations of the stationary nodes is normally influenced by factors such as the sensor bias errors referenced above, and these factors are not related to the angular rate. These factors are sometimes referred to herein as "error terms". Such error terms may arise, for example, from sensor bias errors (which are sometimes referred to collectively as "bias offset") or the effects of temperature on the sensor. Mathematically, a first-order model of the sensor output signal may be expressed as:

$$V_{out} = V_{Rate} + V_{offset} + V(T) \qquad \text{Eq. 1.1}$$

where $V_{out}$ is the sensor output voltage, $V_{Rate}$ is the voltage attributable to the angular rotation rate of the sensor, $V_{offset}$ is the voltage attributable to the sensor bias error, and $V(T)$ is the voltage attributable to the change in the sensor output signal due to temperature. These last two terms ($V_{offset}$ and $k(T)$) are considered error terms, and they can be combined into a single error term $V_e$ to yield the following equation:

$$V_{out} = V_{Rate} + V_e \qquad \text{Eq. 1.2}$$

For navigation or directional applications, small errors included in the sensor output signal may accumulate and/or grow as the output signal is processed, and thus these errors may result in a significant negative impact on the ability of the angular rate sensor to determine the angular rate of the object, which in turn may negatively impact the ability of a navigation system to navigate and/or identify a particular direction. For many such navigation systems, such as a missile targeting system, it is important that the error terms are greatly minimized or eliminated.

For an angular rate sensor having the ability to produce a positive-voltage output signal and a negative-voltage output signal without changing the angular rate of the sensor, the output signal voltage for each of these two operating configurations may be expressed mathematically as:

$$V_P = V_{Rate} + V_e \qquad \text{Eq. 1.3}$$

$$V_N = -V_{Rate} + V_e \qquad \text{Eq. 1.4}$$

where $V_P$ is the output voltage from the sensor operating in the configuration that produces a positive output voltage, and $V_N$ is the output voltage from the sensor operating in the configuration that produces a negative output voltage. Equations 1.3 and 1.4 indicate that the error terms, $V_e$, which are introduced by the electronics and other external factors, are the same for both operating configurations. Mathematically speaking, by subtracting one of these equations from the other, the error terms $V_e$, can be eliminated. In practice, that subtraction operation may be accomplished by (a) taking a first measurement while in one of the operating configurations, (b) taking a second measurement while in the other operating configuration, and (c) subtracting one of the measurements from the other measurement, which may be performed digitally via a computer. By executing that subtraction operation, the error terms $V_e$ are eliminated from the result. For example, by subtracting the output signal $V_N$, (Eq. 1.4) from the output signal $V_P$ (Eq. 1.3) to achieve a differential output $(V_P-V_N)$, the result is:

$$V_P - V_N = 2V_{Rate} \qquad \text{Eq. 1.5A}$$

Alternatively, a similar result may be achieved by subtracting the output signal $V_P$ (Eq. 1.3) from the output signal $V_N$, (Eq., 1.4) to achieve a differential output $(V_N-V_P)$, the result is:

$$V_N - V_P = -2V_{Rate} \qquad \text{Eq. 1.5B}$$

By dividing both sides of Eq. 1.5A by 2, or dividing both sides of Eq. 1.5B by –2, the following equation is obtained:

$$\frac{V_P - V_N}{2} = V_{Rate} \qquad \text{Eq. 1.6}$$

Eq. 1.6 assumes that the magnitude of $V_{Rate}$ in Eq. 1.3 is equal to the magnitude of $V_{Rate}$ in Eq. 1.4. Therefore, the change from one operating configuration to the other should be made quickly before $V_{Rate}$ changes significantly.

Figure 2A:
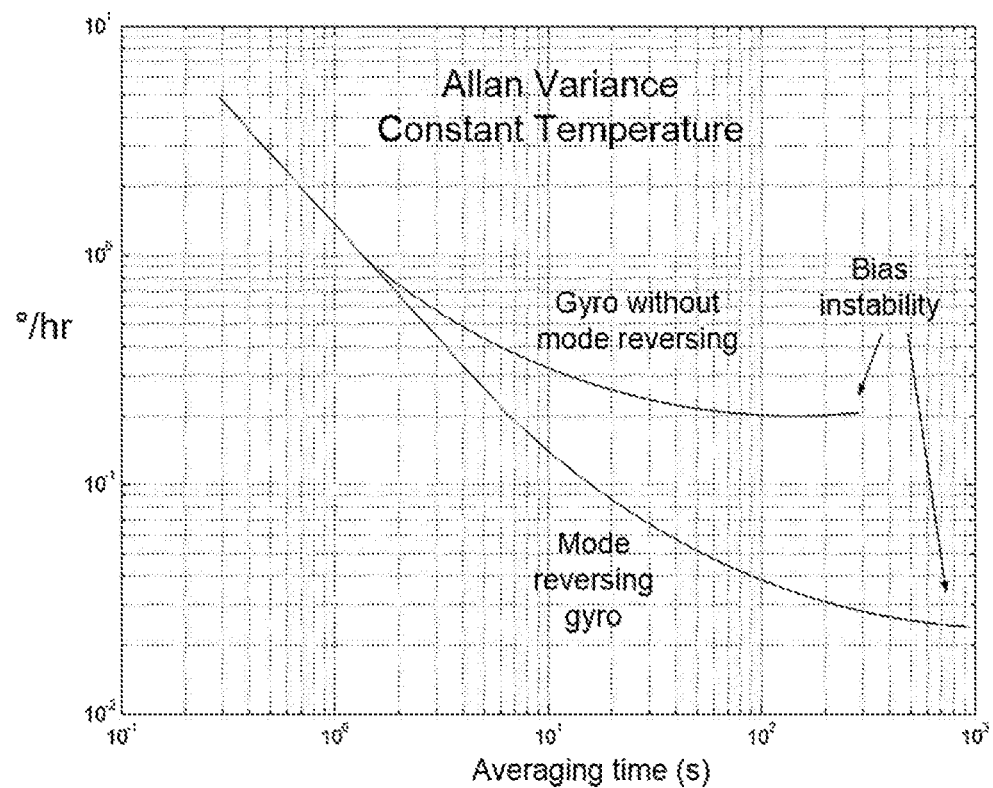
FIG. 2A, which plots Allan variance at a constant temperature for two different types of angular rate measurement systems.
Figure 2B:
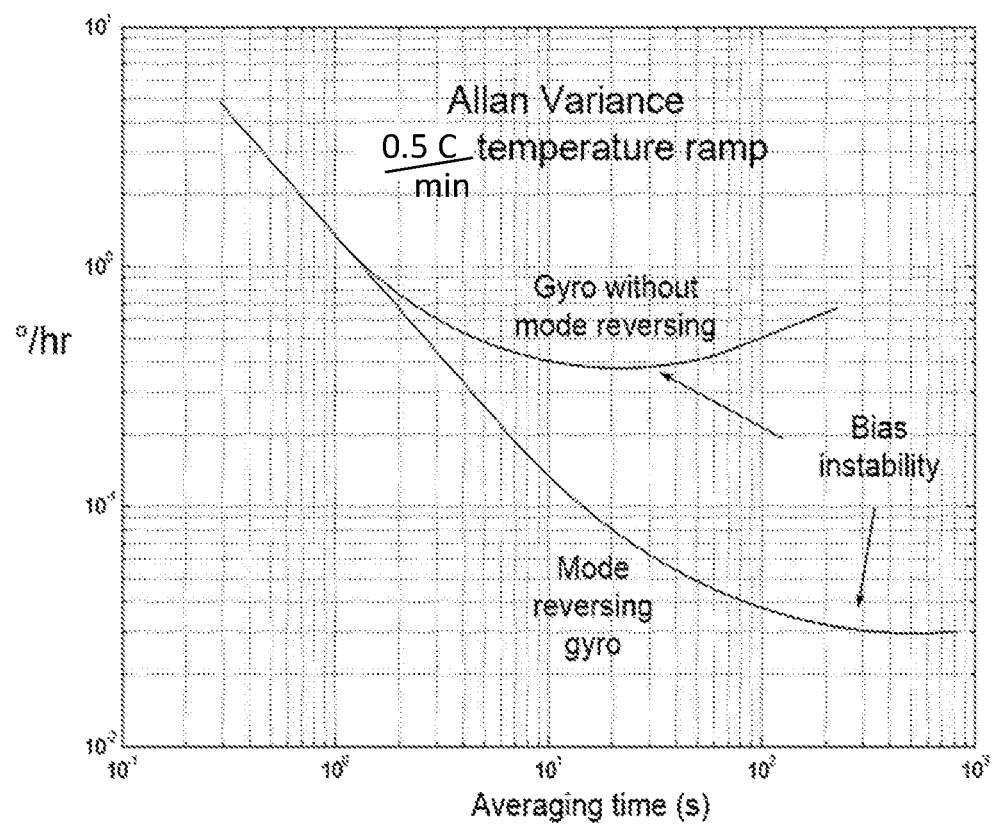
FIG. 2B, which plots Allan variance for two different types of angular rate measurement systems in the presence of a temperature drift of 0.5 degrees C. per minute.

A significant performance improvement can be realized by determining the differential output produced by an angular rate sensor that can quickly change its operating configuration to achieve a polarity reversal with regard to the measured output signal. For example, one measure of performance is the Allan variance, which is a measure of an oscillator's frequency stability. FIGS. 2A and 2B are each an Allan variance plot having a vertical axis in units of degrees-per-hour, and a horizontal axis in units of seconds. The horizontal axis represents the length of time over which data from a sensor is averaged in order to produce an output value. That length of time is identified in FIGS. 2A and 2B as the "Averaging time", but is sometimes referred to as the "observation time". As is the case with most oscillators, the Allan variance changes depending on the averaging time. From both FIGS. 2A and 2B, it will be noted that for averaging times less than about 1.2 seconds (a) the Allan variance is quite high, and (b) the Allan variance for two types of sensors is similar.

In each of FIG. 2A and FIG. 2B, the Allan variance of an angular rate sensor that can quickly change its operating configuration in order to reverse the polarity of its measured output signal voltage is compared to the Allan variance of an angular rate sensor without such polarity reversing ability. For averaging times more than about 1.5 seconds, the Allan variance for the two sensors is different, and becomes more different as the averaging time increases.

A feature common to both of the Allan variance plots (FIG. 2A and FIG. 2B) is the bias instability point, which is the lowest point on an Allan variance curve. The bias instability point is a measure of the bias performance of an angular rate measurement system, and a measurement system having a low bias instability point is often said to have a small bias error. In FIG. 2A, the sensor having the ability to quickly change its operating configuration is seen to reach a bias instability point that is nearly one order of magnitude lower than the sensor without the ability to quickly change its operating configuration. The difference between the two sensors is more notable in FIG. 2B where, in the presence of temperature drift, the configuration-changing sensor shows more than an order of magnitude improvement in bias instability when compared to the unmodified sensor.

Figure 3:
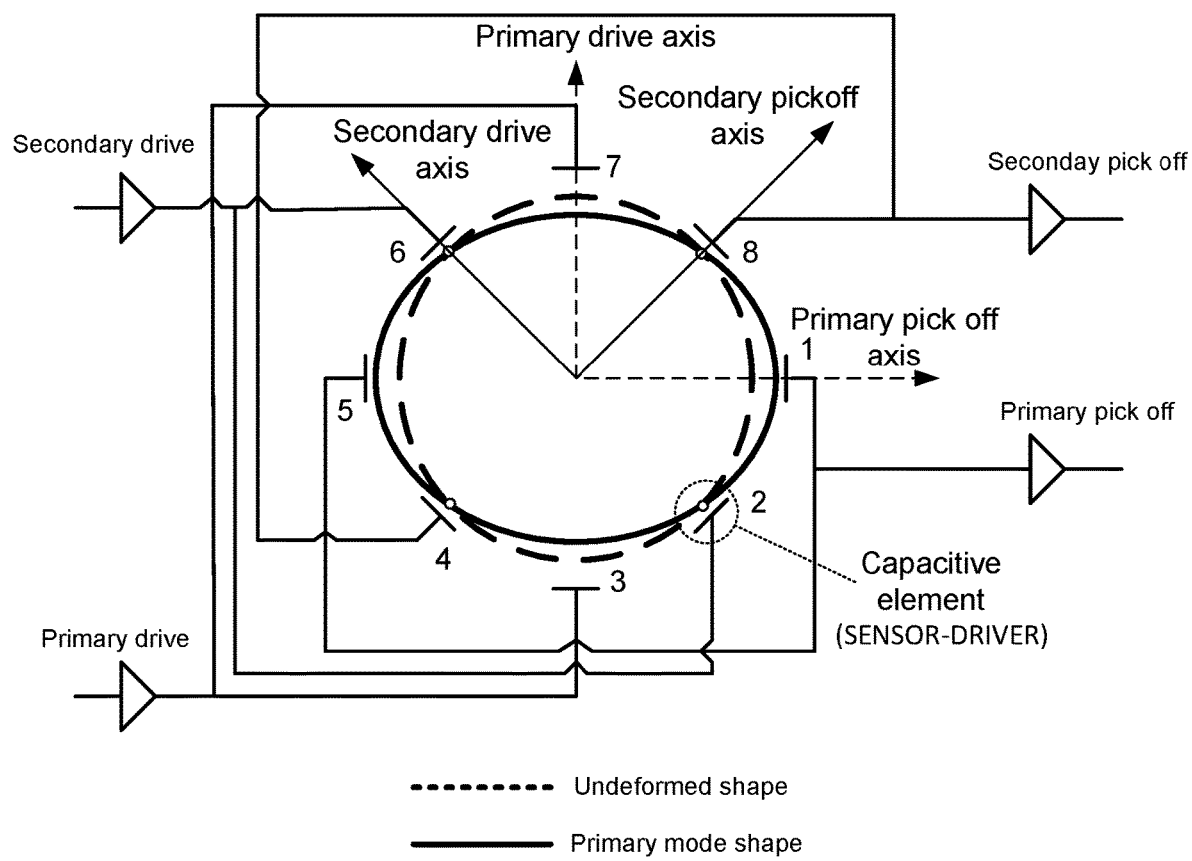
FIG. 3, which schematically illustrates an angular rate sensor that is in keeping with the invention.

Having provided a general explanation, we will now provide additional details about systems and methods that are in keeping with the invention. FIG. 3 is a schematic of a system that is in keeping with the invention. The sensor configuration shown in FIG. 3 includes an array of sensor-driver elements, which in this embodiment are depicted as capacitive elements, positioned with regard to a ring structure in order to apply a force to the ring (i.e. "drive" the ring), or detect vibration of the ring (i.e. "sense" the location of the ring). The sensor-driver elements may be capacitors, inductors, or piezoelectric devices, or combinations of these. The ring structure is shown in FIG. 3 as a solid-line oval and as a dashed-line oval to represent (a) that the ring structure is vibrating radially, and (b) to generally depict the extremes of that vibration along the primary axes.

The sensor-driver elements shown in FIG. 3 are spaced at intervals of 45 degrees around the ring. When in a first operating configuration, one pair of sensor-driver elements (labeled 1 and 5) may be used to detect the location of the ring along an axis that we will call the "primary pick-off axis", and another pair of sensor-driver elements (labeled 3 and 7) may be used to apply a force to the ring along an axis that we will call the "primary drive axis". The sensor-driver elements on a drive axis are used to vibrate the ring. The primary pick-off axis and the primary drive axis are ideally oriented at 90° from each other. When in the first operating configuration, a third pair of sensor-driver elements (labeled 4 and 8) may be used to detect the location of the ring along an axis that we will call the "secondary pick-off axis", and a fourth pair of sensor-driver elements (labeled 2 and 6) may be used to apply a force to the ring along an axis that we will call the "secondary drive axis". The secondary pick-off axis and the secondary drive axis are ideally oriented at 90° from each other. FIG. 3 illustrates that the secondary and primary axes may be located approximately 45 degrees from each other. For example, the primary drive axis and the secondary drive axis are oriented about 45° from each other.

Without an externally applied rate $\Omega$, the sensor-driver elements may be energized so as to create a standing wave that (a) is aligned with the primary axes, (b) is maintained at a constant amplitude, and (c) has stationary node locations where the ring does not move. For ease of reference, each stationary node location is said to reside on one of two secondary axes. The angular rate sensor may be configured so that a sensor-driver element is positioned at each of these stationary node locations. With the rate sensor attached to an object. (e.g. a vehicle), when the object rotates, the sensor also rotates with the rotating object, and the standing wave attempts to move, but at a slower rate than the object. The resulting relative motion of the ring (at the rate $\Omega$) and of the standing wave (at the rate $3/5\Omega$) will be detected by sensor-drivers in the secondary pick-off electronics because these sensor-driver elements will sense movement of the ring at a location where a stationary node would be in the absence of the rotation. In response, a voltage will be applied to the sensor-driver elements in the secondary drive in order to force the stationary nodes of the ring to stay at the stationary node locations, and thereby force the standing wave back to the position the standing wave would have in the absence of rotation (i.e. its normal position). The voltage required to apply that force via the sensor-driver elements located on the secondary drive axis, and thereby force the standing wave back to its normal position, is proportional to the externally applied rate Ω.

In the case where the capacitors are used as the sensor-drivers, some of the capacitors will be used to apply force to the ring, and some of the capacitors will be used to sense the location of the ring. Capacitors have two conductive surfaces that are separated from each other. Often, the space between the conductive surfaces has a dielectric material, such as air. In some sensors, manufacturing occurs at a vacuum, and the resulting dielectric constant associated with the space between the two conductive surfaces is effectively the dielectric constant of a vacuum (co). With reference to FIG. 3, one of the conductive surfaces of the capacitor moves with the ring and may be the ring itself. The other conductive surface is fixed relative to the ring so that as the ring moves, the distance between the conductive surfaces changes. When a capacitor is used as a driver (rather than a sensor), force may be applied to the ring by changing the relative voltage existing between the two conductive surfaces. An electrostatic force F generated by the capacitor is:

$$F = 1/2 \varepsilon A V^2 / g^2$$

where "A" is the area of the conductive surface, "ε" is the dielectric constant, "V" is the voltage difference between the conductor surfaces, and "g" is the distance between the conductive surfaces. When a voltage difference is created with regard to the conductive surfaces, an electrostatic force is created. By timing the application of the voltage difference, the force can be created in order to push and pull on the ring in order to cause the ring to vibrate at its resonant frequency.

When a capacitor is used as a sensor (rather than a driver), as the ring moves and therefore one of the conductive plates moves along with the ring, the distance between the conductive surfaces changes, and therefore so too does the capacitance of the capacitor. The change in capacitance can be detected, measured, and correlated to the position of the vibrating ring at a particular point in time at the location where that capacitor resides. The capacitance of the capacitor is:

$$C = A \varepsilon / g$$

where "A" is the area of the conductive surface, "g" is the distance between the conductive surfaces, and "ε" is the dielectric constant for the dielectric.

The sensor-drivers may be piezoelectric devices. The piezoelectric material in such a sensor generates a voltage when the piezoelectric material is subjected to mechanical stress. For example, quartz is a piezoelectric material that is often used in sensors. Also used in MEMS sensors is an applied layer of aluminum nitride, AlN. Sensor-drivers having a piezoelectric material may be located so as to generate a voltage that is proportional to the motion of the ring when used as a sensor, or proportional to the desired motion of the ring when used as a driver.

Inductive devices may be well suited for use as the sensor-drivers for situations in which high accuracy and precision (e.g. low noise and good stability (i.e. little change in sensor output over a range of temperatures)) are required, such as in aerospace applications. Inductive elements utilize a magnetic field generated by a permanent magnet and conductive wires to exert forces that vibrate the ring in a plane that is perpendicular to that magnetic field. The physics of this approach is explained by Faraday's law which states that a current, i, will be generated when a wire, l, passes through a magnetic field, B, and by Lorentz's force law which states that a force will be generated when a current passes through a wire in a magnetic field. Lorentz's force law is mathematically described as:

$$\vec{F} = i \vec{L} \times \vec{B}$$

$$F = i l_w B \quad \text{Eq. 2.1}$$

where $$i = \frac{V_{PD}}{R_{wire}} \quad \text{Eq. 2.2}$$

and where i is the current passing through the wire, $V_{PD}$ is the associated voltage, $l_w$ is the length of the wire, and $R_{wire}$ is the resistance of the wire. Faraday's law is:

$$v = \frac{d\Phi}{dt} = l_w B \dot{x} \quad \text{Eq. 2.3}$$

where the output voltage, v, is proportional to the velocity of the wire, $\dot{x}$, in the magnetic field B. Our angular rate sensor may be configured to realize Lorentz's force law and Faraday's law.

Figure 4:
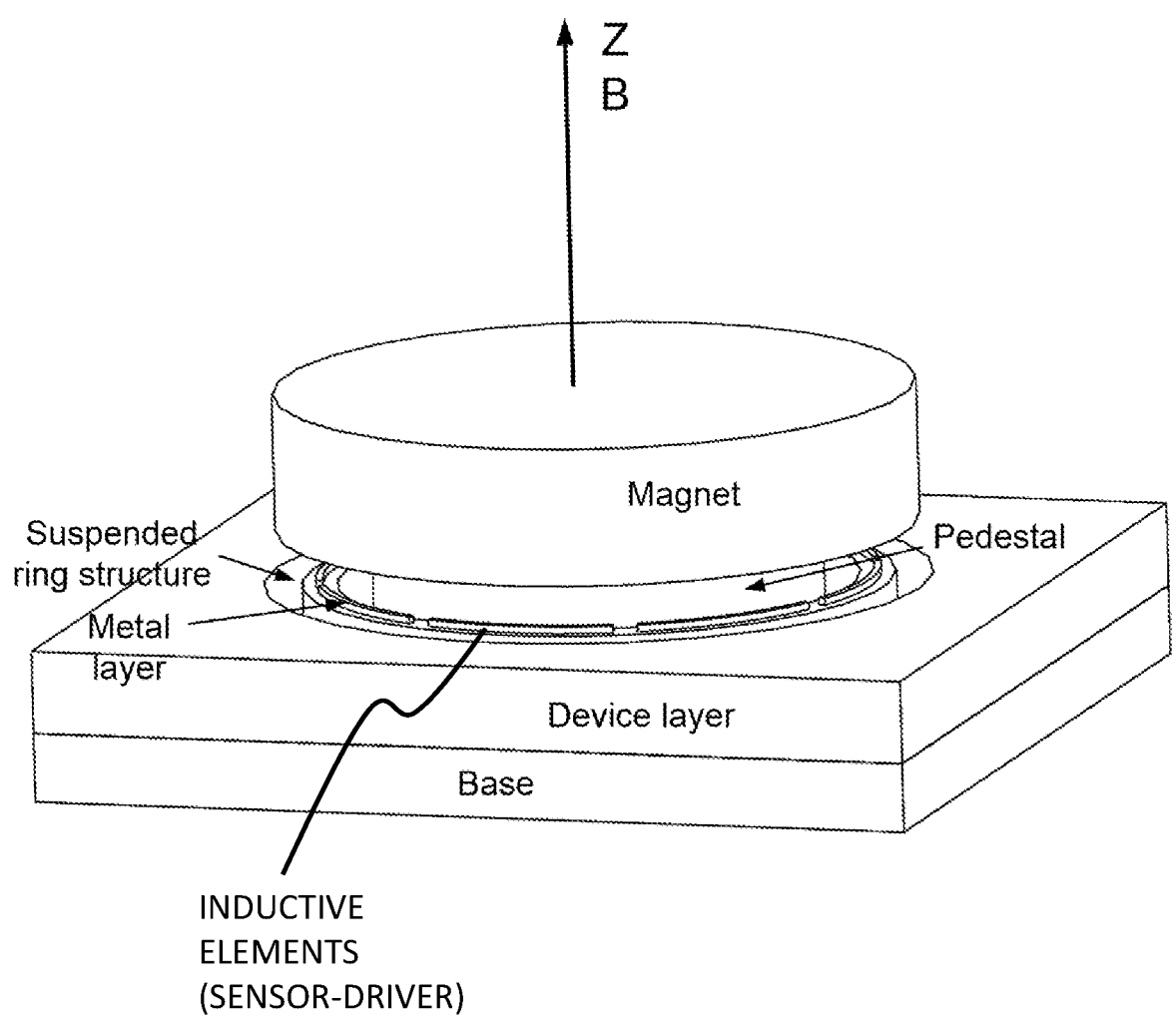
FIG. 4, which depicts certain aspects of an angular rate sensor that is in keeping with the invention and has inductive sensor-driver elements on a ring structure.
Figure 5:
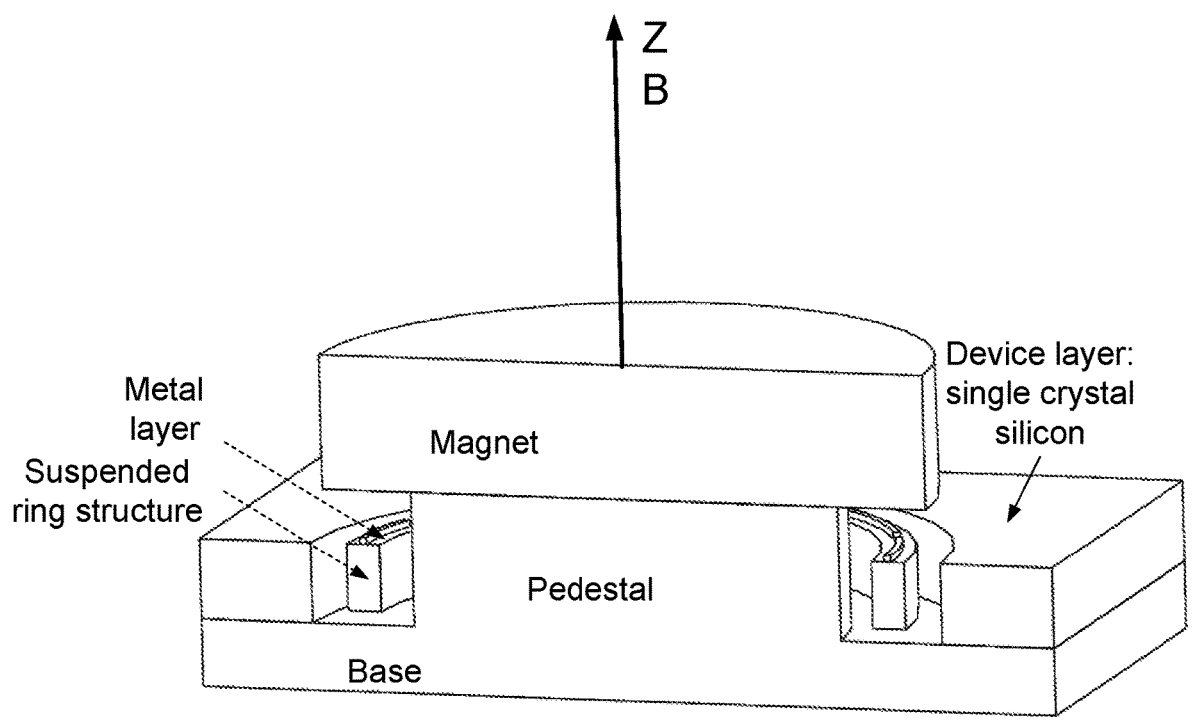
FIG. 5, which is a sectional view of the angular rate sensor depicted in FIG. 4.

A sensor according to the invention may have a device layer that includes the active portion (i.e. the vibrating structure) of the sensor. With reference to FIG. 4 and FIG. 5, the device layer includes a ring structure and flexible elements that support the ring structure above a base layer. The ring may be made of single-crystal silicon. In some embodiments of an angular rate sensor, a plurality of conductor segments are placed, for example by metal deposition, on the silicon ring or on a surface (or series of connected surfaces) that is itself connected to the ring so that such surface(s) moves with the ring. Each conductor segment covers a portion of the silicon ring, and is electrically isolated from the other conductor segments, as well as the ring itself. Each of these conductor segments is part of a particular sensor-driver, which may be used to either (a) monitor movement of the ring, or (b) apply a force to the ring.

A magnet may be bonded to a pedestal that extends through a portion of the space surrounded by the ring. The pedestal holds the magnet stationary relative to the plane in which the ring vibrates so that the magnetic field B generated by the magnet is oriented perpendicular to the plane in which the ring vibrates (that plane being perpendicular to the z-axis, e.g. see FIGS. 4 and 5), and through the silicon ring structure, including its deposited conductor segments. Elements of a sensor that are in keeping with this invention are shown in FIG. 4, and additional details are included in the cut away view found at FIG. 5.

In the case where inductors are used as the sensor-drivers, the conductor segments deposited on the ring act as the "wires" described above in conjunction with the discussion of Lorentz's law and. Faraday's law. An alternating current is passed through a first set (which may be a pair) of the conductor segments in the presense of the magnetic field in order to generate a driving force that vibrates the ring structure in the radial direction. See Lorentz's law. The resulting movement of the ring structure is detected by measuring the current generated in a second set (which may be a pair) of the conductor segments as a result of the second set moving through the same magnetic field. See Faraday's law.

Figure 6:
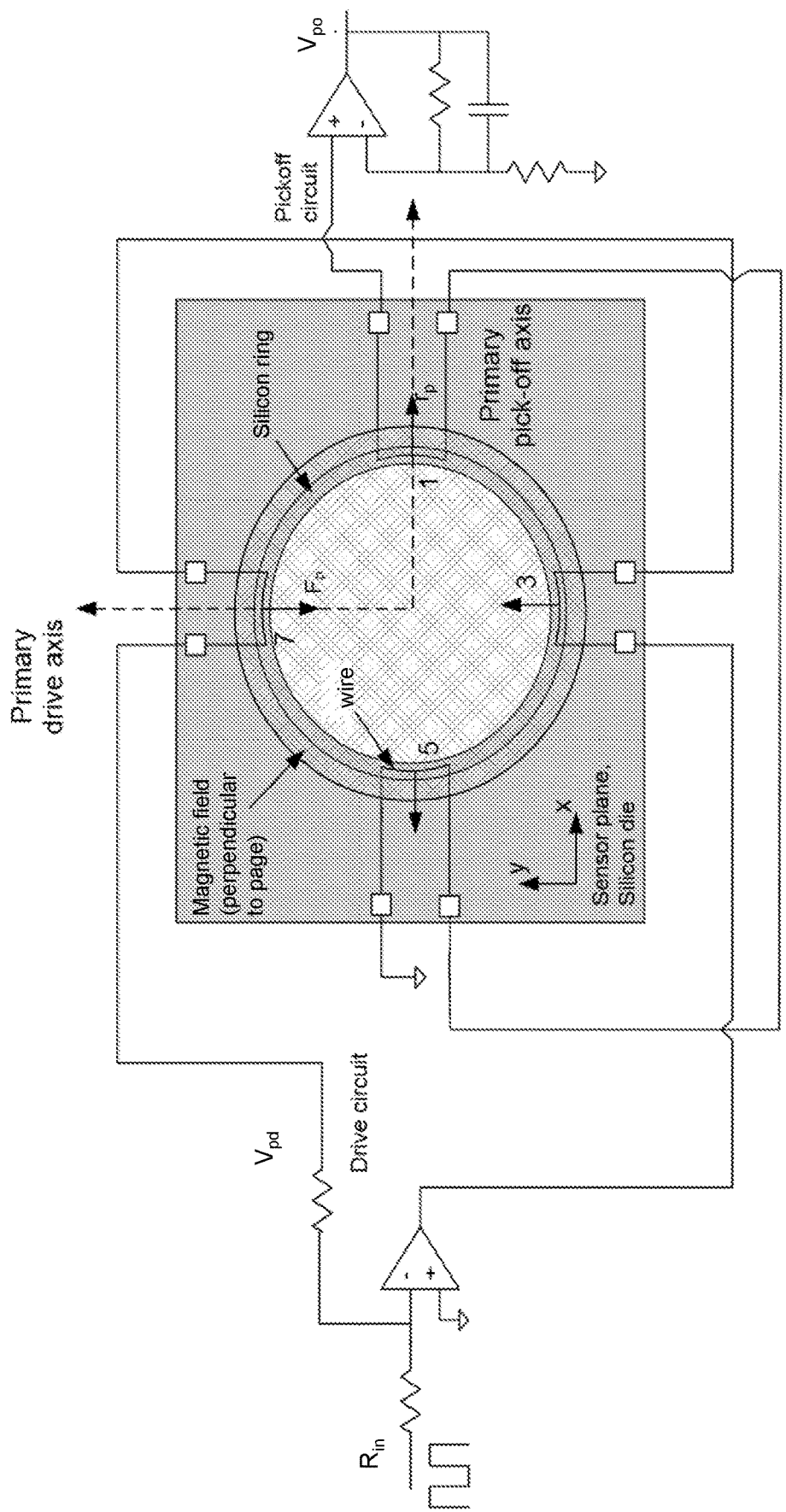
FIG. 6, which schematically illustrates aspects of a primary operating configuration of an angular rate sensor that is in keeping with the invention, and in particular schematically illustrates a physical configuration to apply force to the ring and drive the ring along the primary axis at its resonant frequency.
Figure 7:
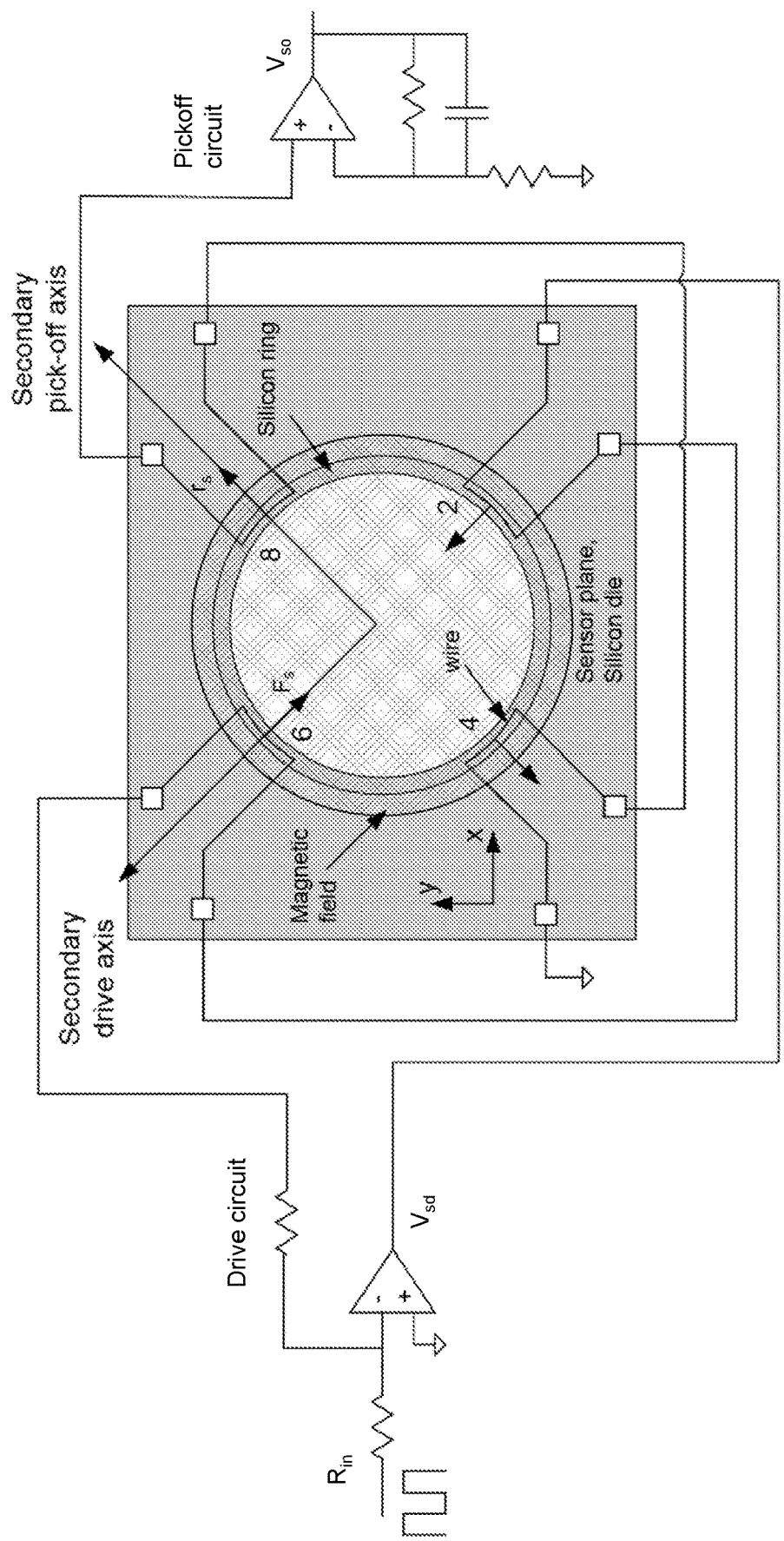
FIG. 7, which schematically illustrates aspects of a secondary operating configuration of the angular rate sensor of FIG. 6, and in particular schematically illustrates a physical configuration to apply force to the ring and drive the ring along the secondary axis at its resonant frequency.

The operation of an embodiment of our invention is further described with reference to FIG. 6 and FIG. 7, which illustrate a first operating configuration corresponding to FIG. 3. For clarity, only the first mode is shown in FIG. 6, and only the second mode is shown in FIG. 7. Each of the conductor segments bonded to the ring may form part of an inductor that may be used in lieu of the capacitors shown in FIG. 3. The inductors depicted in FIG. 6 and FIG. 7 are numbered equivalently to the capacitors depicted in FIG. 3. In the first operating configuration, a pair of the inductors (e.g. inductors 1 and 5) may be used to detect the movement of the ring along the primary pick-off axis, while another pair of inductors (e.g. inductors 3 and 7) may be used to apply forces to the ring in the direction of the primary drive axis. Each sensor-driver in a pair may be positioned 180 degrees from the other sensor-driver in the pair. By orienting the ⅜-pair 90 degrees from the ⅕-pair, an inward acting force at inductors 3 and 7 results in an outward radial displacement at inductors 1 and 5. Similarly, an outward acting force at inductors 3 and 7 results in an inward radial displacement at inductors 1 and 5. In operation, a square-wave voltage signal, at the resonant frequency of the ring, may be applied through the primary drive electronics (e.g. inductors 3 and 7). The resulting primary force, $F_P$, acts inward or outward on the sensor ring according to the direction of the current passing through inductors 3 and 7. This results in the primary displacement, $r_P$. The primary pick-off electronics, which includes inductors 1 and 5, are shown along the primary pick-off axis, and used to measure the primary displacement $r_P$.

The secondary axes are depicted in FIG. 7. The secondary axes are oriented 45° from the corresponding primary axes. A square-wave voltage signal, at the resonant frequency of the ring, may be applied through the secondary drive electronics (inductors 2 and 6) in order to create the secondary force, $F_S$, that acts inward or outward on the ring structure according to the direction of the current passing through inductors 2 and 6. This results in the secondary displacement, $r_S$. The secondary pick-off electronics, which in this example include inductors 4 and 8, are shown along the secondary axis, and used to measure the secondary displacement $r_s$.

Configuration-Changing Angular-Rate Sensor

Our configuration-changing sensor changes operating configurations rapidly, and uses the sensor output signal from each operating configuration in order to reduce or eliminate sensor bias errors and temperature induced errors that may influence the output of each operating configuration. A first one of the operating configurations of our angular rate sensor produces a measured output signal that is a positive voltage, and a second one of the operating configurations produces a measured output signal that is a negative voltage for the same input rate. The equation-of-motion describing our ring sensor is shown in Equation 3.4, which describes the dynamic response of the ring to an applied forcing function.

$$\frac{\partial^2}{\partial t^2}\begin{bmatrix} r\cos\varphi \\ r\sin\varphi \end{bmatrix} + \frac{\omega_n}{Q}\frac{\partial}{\partial t}\begin{bmatrix} r\cos\varphi \\ r\sin\varphi \end{bmatrix} + \omega_n^2\begin{bmatrix} r\cos\varphi \\ r\sin\varphi \end{bmatrix} + \lambda\Omega\frac{\partial}{\partial t}\begin{bmatrix} 0 & -1 \\ 1 & 0 \end{bmatrix}\begin{bmatrix} r\cos\varphi \\ r\sin\varphi \end{bmatrix} = \begin{bmatrix} 0 \\ 0 \end{bmatrix} \quad \text{Eq. 3.4}$$

where r is the radial displacement of the ring, $\varphi$ is the angular position in the resonate mode shape, $\omega_n$ is the natural frequency of the ring, Q is the quality factor, $\Omega$ is the externally applied rotation rate and n is the mode number. The mode-number coefficient, $\lambda$, is found via Equation 3.5.

$$\lambda = \frac{n^2 - 1}{n^2 + 1} \quad \text{Eq. 3.5}$$

The angular position $\varphi$ is the angular position of the mode shape around the ring. For this sensor, the mode number is 2 because the mode shape has two wave lengths around the ring structure. So, starting with the idea that when the mechanical angle $\theta=0°$, the angular position $\varphi$ in the resonate mode shape is equal to 0°, then the angular position $\varphi$ will be 720° when the mechanical angle ($\theta$) is 360°. A higher mode number would mean that the mode shape has additional wave lengths around the ring, and it is possible that a sensor according to the invention may have a higher mode number when that mode number is an even number.

The anti-nodes are the points of maximum deflection at the primary axes, and by convention are said to be at $\varphi=0°$), and the anti-nodes of the secondary configuration are said to be at $\varphi=90°$. So, the primary axis is separated from the secondary axis by a mechanical angle of $\theta=45°$. With the sensor mode shapes located as described, the equation of motion (Eq. 3.4) can be written as:

$$\begin{bmatrix} \ddot{r}_P \\ \ddot{r}_S \end{bmatrix} + \frac{\omega_n}{Q}\begin{bmatrix} \dot{r}_P \\ \dot{r}_S \end{bmatrix} + \omega_n^2\begin{bmatrix} r_P \\ r_S \end{bmatrix} + \lambda\Omega\begin{bmatrix} 0 & -1 \\ 1 & 0 \end{bmatrix}\begin{bmatrix} \dot{r}_P \\ \dot{r}_S \end{bmatrix} = \begin{bmatrix} 0 \\ 0 \end{bmatrix} \quad \text{Eq. 3.6}$$

where $r_P = r\cos\varphi$ is the radial displacement of the ring in the direction of the primary axis and $r_S = r\sin\varphi$ is the radial displacement of the ring in the direction of the secondary axis. The top portion of Eq. 3.6 describes the primary radial movement of the ring, and the bottom portion of Eq. 3.6 describes the secondary radial motion. The two equations are coupled by the externally applied rate $\Omega$. In more detail, the equation of motion for the secondary axis is:

$$\ddot{r}_S + \frac{\omega_n}{Q}\dot{r}_S + \omega_n^2 r_S + \lambda\Omega\dot{r}_P = 0 \quad \text{Eq. 3.7}$$

Eq. 3.7 shows that the secondary response is driven by the product of the externally applied rate, $\Omega$, and the primary velocity, $\dot{r}_p$.

Additional information about operating configurations will be provided. A first operating configuration (FIGS. 6 and 7) is described above, and additional details will be provided below. A second operating configuration may be achieved if the primary mode (FIG. 6) is replaced by the secondary mode (FIG. 7), which may be understood as rotating $\varphi$=+90°. More specifically, the second operating configuration utilizes the sensor-drivers at 2 and 6 as the primary drive axis, and the sensor-drivers at 4 and 8 as the primary pick-off axis. With such an arrangement, Eq. 3.6 becomes:

$$\begin{bmatrix} \ddot{r}_P \\ \ddot{r}_S \end{bmatrix} + \frac{\omega_n}{Q}\begin{bmatrix} \dot{r}_P \\ \dot{r}_S \end{bmatrix} + \omega_n^2\begin{bmatrix} r_P \\ r_S \end{bmatrix} + \lambda\Omega\begin{bmatrix} 0 & +1 \\ -1 & 0 \end{bmatrix}\begin{bmatrix} \dot{r}_P \\ \dot{r}_S \end{bmatrix} = \begin{bmatrix} 0 \\ 0 \end{bmatrix} \quad \text{Eq. 3.8}$$

And the response along the primary pick-off axis of the secondary operating mode, as detected by sensor-driver elements 4 and 8, is:

$$\ddot{r}_S + \frac{\omega_n}{Q}\dot{r}_S + \omega_n^2 r_S - \lambda\Omega\dot{r}_P = 0 \qquad \text{Eq. 3.9}$$

Eq. 3.9 shows that the response detected by elements 4 and 8 in the second operating mode is dependent on the same product as in Eq. 3.7, except that there is a minus sign with regard to the term $\lambda\Omega\dot{r}_p$, which indicates that the response of the sensor to the same external rate is changed. This means that when the operating configurations are selected properly, an externally applied rate $\Omega$ will generate a response in the secondary of the first operating configuration that is 180° out of phase from the response of the secondary of the second operating configuration.

This change in operating configuration (i.e. a change from one operating configuration to another) can be implemented in the angular rate sensor by reconfiguring the interface between the sensor and the control electronics. With regard to the first operating configuration, the basic configuration of the sensor and the control electronics is explained with reference to FIG. 8A and FIG. 8B. The sensor-drivers numbered 1 through 8 in FIG. 3, are identified with letters A through H in FIGS. 8A/8B, 9A/9B, and 12A/12B. FIG. 8A and FIG. 8B corresponds to the operating configuration of FIGS. 6 and 7 respectively. In FIG. 8A, the primary output ("PO") results from using the sensor-driver pair C and G, which are located at θ=0° &180°, the primary drive (PD) uses the sensor-driver pair A and E, which are located at θ=90° & 270°, the secondary output (SO) uses the sensor-driver pair D and H, which are located at θ=315° & 135°, and the secondary drive (SD) uses the sensor-driver pair at B and F, which are located at θ=45° & 225°. The mechanical angle (θ) is measured around the ring structure starting at sensor-driver C, where θ=0°, and proceeding counter clockwise. While in this first operating configuration, the output signal $V_p$ may be determined.

The operating configuration can then be changed by changing the primary and secondary axes by φ=+90° in the mode space, which is θ=+45° degrees in the mechanical space. The sensor in this second operating configuration is shown in FIGS. 9A and 9B. Here, the sensor-driver pairs used for the primary and secondary configurations are effectively shifted by one position, which has the effect of rotating the primary and secondary axes by θ=45°. While in this second operating configuration, the output $V_N$ may be determined. Then, having determined $V_p$ and $V_N$, $V_{Rate}$ may be determined according to Eq. 1.6.

Figure 10:
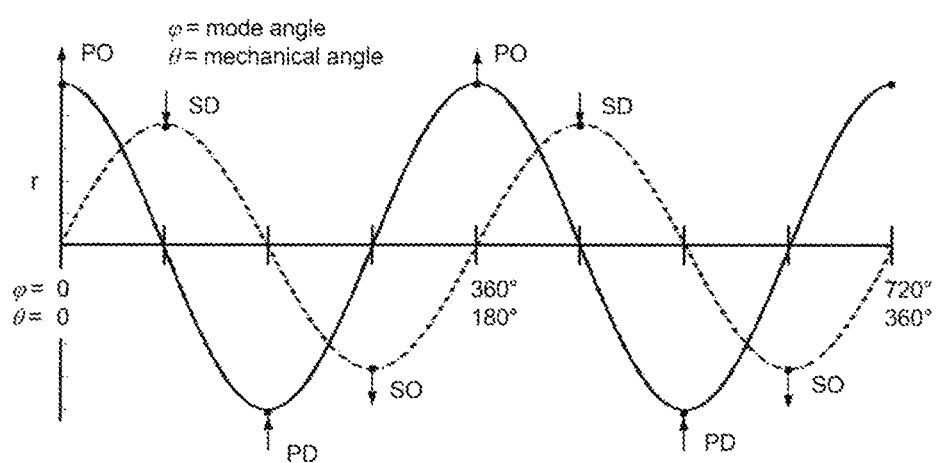
FIG. 10, which plots the radial displacement r of the ring with regard to the primary (solid line) and secondary mode (dashed line) shapes against the mechanical angle, θ, and the mode angle, φ, around the ring structure of an angular rate sensor operating in the first operating configuration depicted in FIGS. 8A and 8B.
Figure 11:
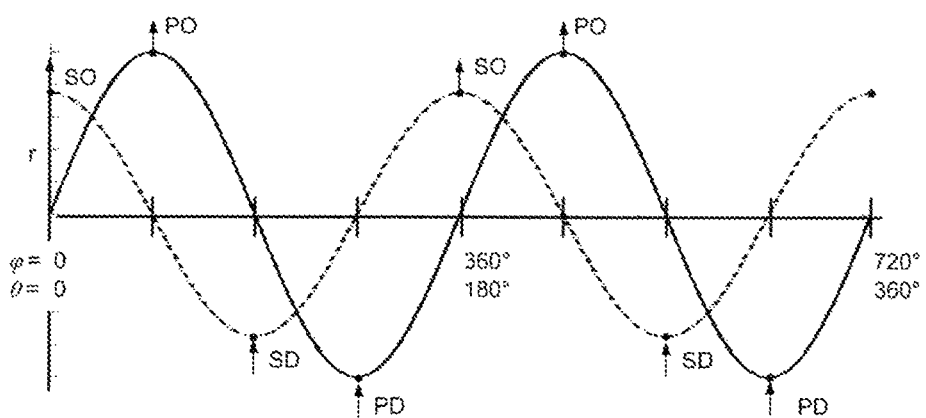
FIG. 11, which plots the radial displacement r of the ring with regard to the primary (solid line) and secondary mode (dashed line) shapes against the mechanical angle, θ, and the mode angle, φ, around the ring structure of the angular rate sensor operating in the second operating configuration depicted in FIGS. 9A and 9B.

Another presentation of the n=2 sensor mode shape gives some additional insight into how the sensor may be operated. The mode shape for the first operating configuration (FIGS. 8A and 8B) is shown in FIG. 10, where the radial displacement of the primary and secondary mode shape are plotted against the mechanical angle (θ) and the mode angle (φ) around the ring structure of the sensor. In FIG. 10, the nodes are at the zero-crossings and the anti-nodes are at the maxima and minima of the wave forms. The mode shape for the second operating configuration of FIGS. 9A and 9B is shown in FIG. 11. From FIG. 11 it will be noted that the primary and secondary axes are shifted relative to FIG. 10 through a mode angle of 90°, which is a mechanical angle of 45°.

A different second operating configuration is described with reference to FIG. 12A and FIG. 12B. In this alternative second operating configuration, the first operating configuration produces the plot shown in FIG. 10, but the alternative second operating configuration produces the plot of FIG. 13. It should be noted that FIG. 13 indicates the secondary mode has been rotated 180° in the mode space, which is 90° in the mechanical space. A comparison of FIG. 13 to FIG. 10 highlights that the primary mode is unchanged when switching from the first operating configuration (FIG. 10) to the second operating configuration (FIG. 13), but the secondary mode is changed. When FIG. 13 and FIG. 11 are compared, it will be recognized that these two arrangements of the components for the second operating configuration yield plots that are quite different.

Figure 12A:
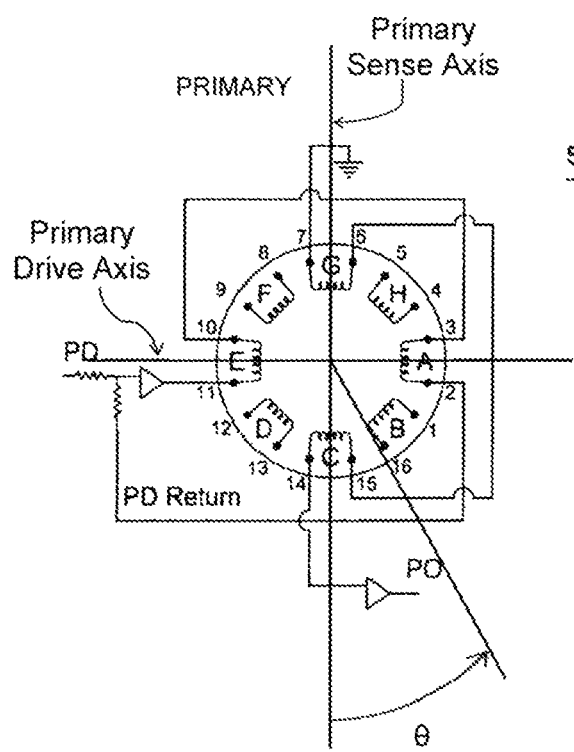
FIGS. 12A and 12B, which diagrammatically illustrate aspects of another second operating configuration for the angular rate sensor, that is different from the second operating configuration depicted in FIGS. 9A and 9B.
Figure 12B:
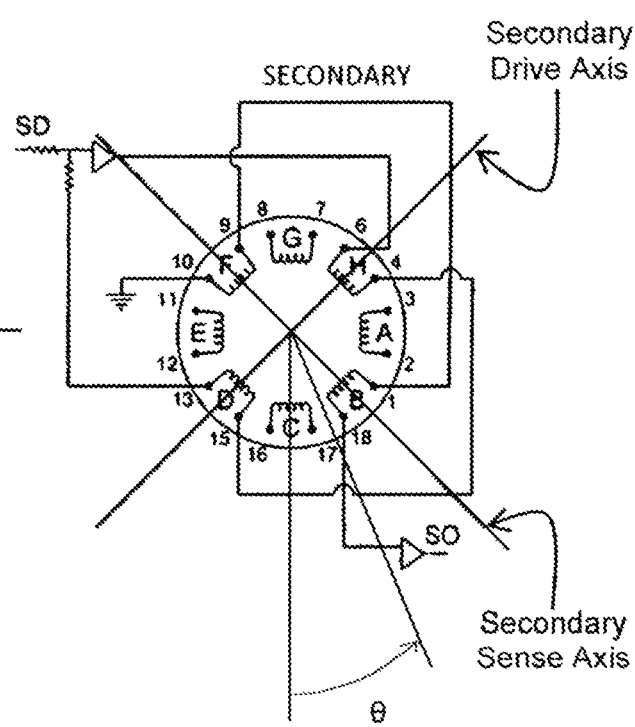
Figure 13:
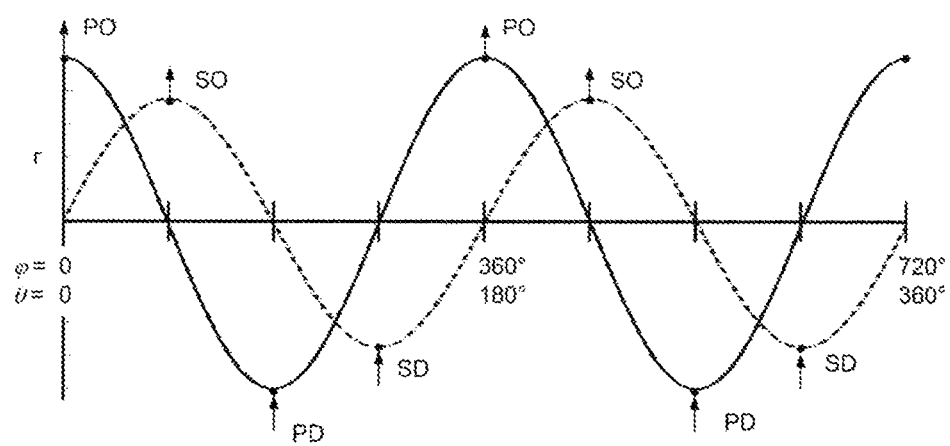
FIG. 13, which plots the radial displacement r of the ring with regard to the primary (solid line) and secondary (dashed line) mode shapes against the mechanical angle, θ, and the mode angle, φ, around the ring structure of the angular rate sensor operating in the second operating configuration depicted in FIGS. 12A and 12B.

FIG. 12A and FIG. 12B show the alternative second operating configuration, which accomplishes the mode shapes of FIG. 13. From FIG. 12B, it will be noticed that the secondary output (SO) uses sensor-driver pair B and F, which are located at θ=45° & 225°, and the secondary drive (SD) uses the sensor-driver pair D and H, which are located at θ=315° & 135°. For this variation of the invention, the difference in rotation in mechanical space can be seen by comparing the secondary axis shown in FIG. 8B to that depicted in FIG. 12B. From that comparison, it will be recognized that in the first operating configuration, the primary axis components of the first operating configuration, which are identified in FIG. 12A, are the same as those identified in FIG. 8A. But, for the second operating configuration, the connections between components are different in FIG. 12B from those depicted in FIG. 8B. The result can be seen in the equation of motion, where for the secondary axes, i.e. at φ=0° and −90°, Eq. 3.6 reduces to:

$$\ddot{r}_S + \frac{\omega_n}{Q}\dot{r}_S + \omega_n^2 r_S - \lambda\Omega\dot{r}_P = 0 \qquad \text{Eq. 3.10}$$

When compared to the equation for the first operating configuration (Eq. 3.7), the minus sign appears in equation 3.10 for the second operating configuration, and the polarity of the measured output signal has been reversed.

Use of the alternative second operating configuration for the sensor may be advantageous compared to the operating configuration of FIGS. 9A and 9B. A substantial amount of time is needed to effect the change from the first operating configuration to the operating configuration of FIGS. 9A and 9B because both the primary and secondary systems need time to settle into normal operation. By using the alternative second operating configuration (FIGS. 12A and 12B), the sensor-drivers along the primary axes are not changed, and so there is significantly less upset to the sensor when compared to the initially described second operating configuration, and thus by using the alternative second operating configuration, only the sensor-drivers of the secondary configuration need time to settle into normal operation after a switch to the alternative second operating configuration. As a result, when using the alternative second operating configuration, the sensor may resume normal operation very soon after the operating configuration is changed. In addition, with regard to the alternative second operating configuration, the sensor bias errors may be reduced (relative to the initially described second operating configuration) because the sensor is, arguably, modified less.

Improving Mode Change Time

In operation, the sensor's oscillatory motion along the primary pick-off axis ($r_P$) may be maintained at a constant amplitude and frequency. The primary pick-off amplitude is the amplitude that would result along the primary pick-off axis from applying oscillating drive forces to the ring along the primary drive axis when the sensor is not rotating. If the sensor rotates while the ring structure is oscillating along the primary axes, the rotational rate ($\Omega$) couples with the motion of the primary axis to generate motion in the secondary axis. See, for example, equation 3.7. This secondary motion is detected by the secondary output circuit, SO.

Changing the operating configuration may cause a significant upset to operation of the sensor, and therefore the sensor may require a significant amount of time to recover and to return to normal operation. For the first set of operating configurations (FIGS. 8A/8B and 9A/9B), the upset occurs because swapping the primary and secondary axes causes the secondary pick-off amplifier (SO) to suddenly detect the movement of the ring structure along a primary axis, which was formerly detected by the primary pick-off amplifier (PO). In such a situation, because the gain of the secondary pick-off amplifier (SO) is typically much greater than the gain of the primary pick-off amplifier, the signal initially generated by movement of the ring structure saturates the output of the secondary pick-off amplifier (SO). Without intervention, the secondary output remains saturated until the motion inherited from the primary axis naturally decays, or rings-down.

This upset caused by changing the operating configuration can be further explained with reference to FIG. 8A and FIG. 8B. In the primary mode (FIG. 8A), sensor-driver pair G and C are used in the primary output to produce the PO signal. When the configuration is changed to the second operating configuration (FIGS. 9A/9B), sensor-driver pair G and C are then part of the secondary output (SO) (see FIG. 9B). But, because the sensor-driver pair G and C was part of the primary axis in the first operating configuration, they are still in motion for some time following the change to the second operating configuration. This inherited motion will generate a voltage that will saturate the SO amplifier.

Figure 14:
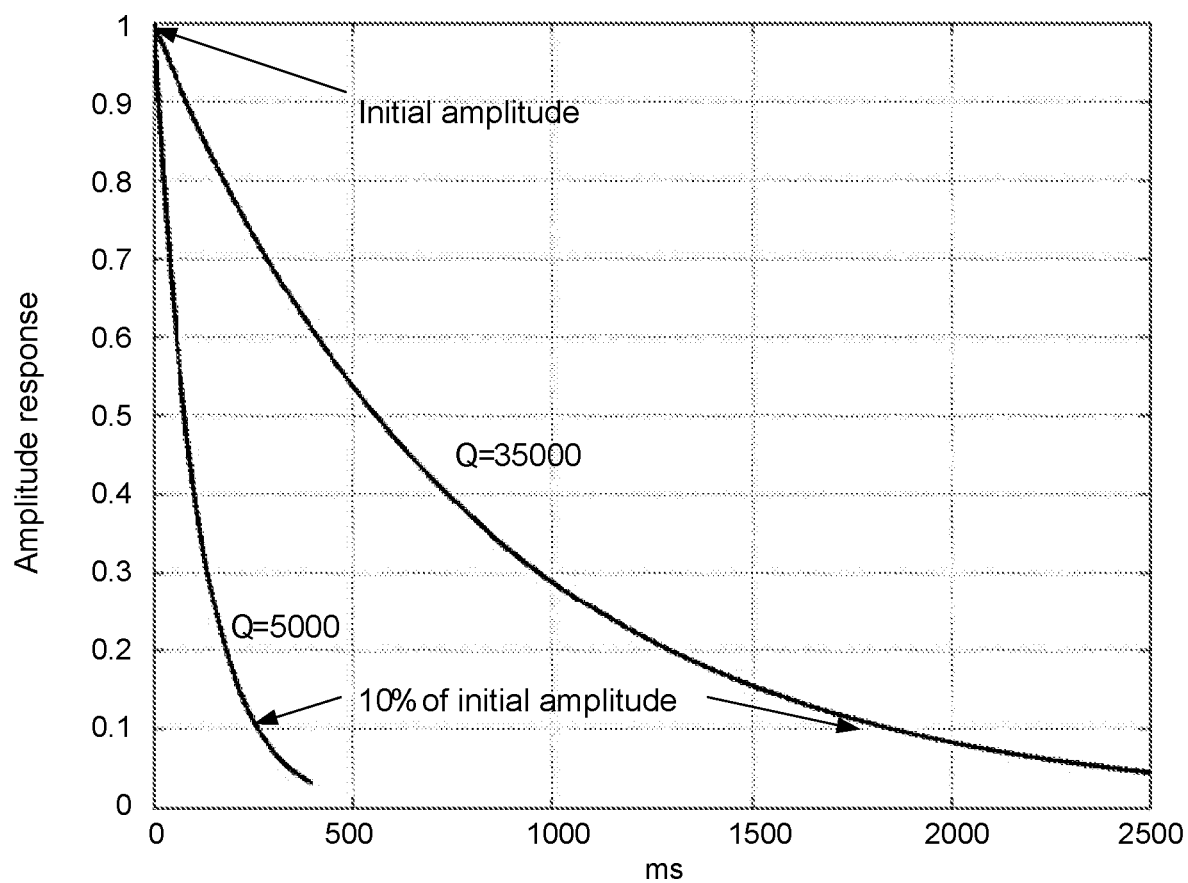
FIG. 14, which plots amplitude response vs. time (in milli seconds) for two different sensors in situations when there is no forced ring down.

The sensor will resume normal operation after the inherited motion rings down, which can take a substantial amount of time. The time to ring down naturally is proportional to the quality factor ("Q") of the sensor, which sometimes is closely related to the pressure at which the sensor was packaged during the manufacturing process. Typically, the Q for a high performance sensor is between 5000 and 100,000. For example, a sensor with a natural frequency of 14 kHz and a quality factor of 5000, and passively dissipating its vibration energy, will have a vibrational amplitude that is 10% of its original amplitude in 250 ms. With a Q of 35,000, the sensor will take nearly 2 seconds to ring down (i.e. to reach 10% of its original amplitude). See FIG. 14.

Figure 15:
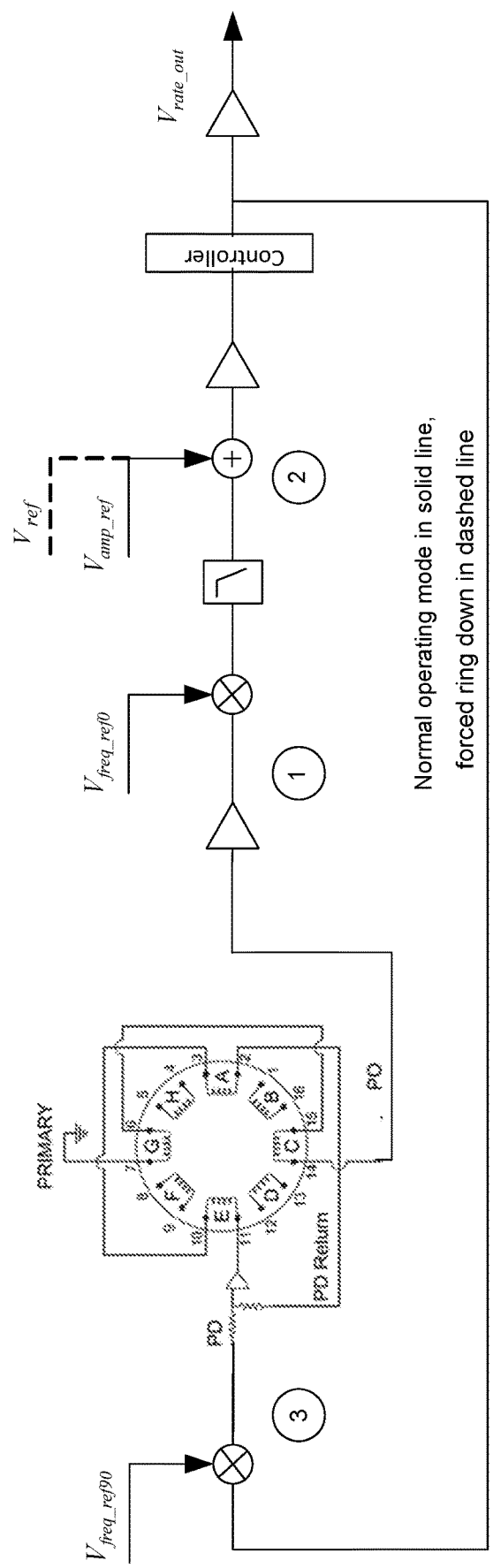
FIG. 15, which schematically depicts a system having the ability to introduce a feedback signal to reduce bias error in the angular rate sensor configured according to FIG. 8A (also FIG. 12A)

This transition time associated with changing the operating configurations can be shortened. The primary axis can be forced to ring-down before the operating configuration is changed. Then, when the operating configuration is changed, the large motions of the primary axes have been largely reduced or eliminated, and the secondary amplifier may assume its new role without saturation. This offers a substantial time reduction because the radial motion of the ring can be forced down much quicker than the ring can naturally ring down;

The forced ring-down of the sensor may be accomplished by setting the amplitude-control reference-voltage to the ground-reference voltage, $V_{ref}$, which for some embodiments of the invention is the virtual ground for the system, so that the system controller will force the primary amplitude to zero before the operating configuration is switched. FIG. 15 depicts a primary amplitude control circuit. Normal operation of the amplitude controller is depicted by the solid lines. When necessary to force a reduction of the motion of the primary axes, the reference voltage is changed from the amplitude reference ($V_{amp\_ref}$) to the ground reference ($V_{ref}$), which is shown in the dashed lines. The controller will then force the amplitude of the primary axis toward zero.

The effect of the controlled ring-down is further described in FIGS. 16A-1, 16A-2, 16B-1, and 16B-2 for the example sensor having a quality factor of 35,000. Without forcing the ring to ring-down, the amplitude of the primary and secondary pick-off signals during a switch from one operating configuration to another are shown in the two time plots comprising FIGS. 16A-1 and 16A-2. In the approach having no forced ring-down, a switch from one operating configuration to the other causes the primary signal to be quickly driven by the control system to full amplitude at about 50 ms (see FIG. 16A-1). The switched secondary however, stays in a saturated condition and only comes back into range as the sensor rings down, and the secondary is not fully recovered until almost 2 seconds after switching the operating configuration (see FIG. 16A-2). During the time the secondary is saturated, the sensor is not able to accurately measure an externally applied rate $\Omega$.

The forced ring down approach is shown in the second set of time history plots at FIGS. 16B-1 and 16B-2. Shortly before changing the operating configuration, the primary amplitude is forced to zero by the controller. With reference to FIG. 15, the primary amplitude is forced to zero by switching the reference voltage from the amplitude reference voltage Vamp_ref. to the virtual ground voltage, $V_{ref}$. With the reference voltage set to the virtual ground, or zero, the controller will assure that the structure oscillation is stopped. In FIG. 16B-1, this is accomplished in about 25 ms. Upon changing the operating configuration, the switched primary reaches full amplitude in about 50 ms (see FIG. 16B-1). Meanwhile the secondary, because the primary amplitude was already driven to zero before the mode change, quickly recovers from the relatively minor disturbance caused by the switch from one operating configuration to the other (see FIG. 16B-2). The sensor is ready to measure rate again after a total transition time of 150 ms. Therefore, the forced ring-down approach is expected to improve the transition time of the sensor from almost 2 seconds to 150 ms.

Temperature Coefficients

Sensor errors may not be completely eliminated by switching the operating configuration. The bias errors and temperature coefficients of the two operating configurations may not be identical. With Eq. 1.3 and Eq. 1.4 in mind, a more detailed model of the sensor output captures additional characteristics of the sensor, and can be represented mathematically as:

$$V_P = V_{Rate} + V_{Bp} + k_{Bp}T$$

$$V_N = -V_{Rate} + V_{Bn} + k_{Bn}T \qquad \text{Eq. 5.1}$$

$V_{Bp}$ and $V_{Bn}$ are the sensor bias errors associated with the two operating configurations, and $k_{bp}$ and $k_{bn}$ are the temperature coefficients of the two operating configurations. In this more sophisticated model, neither the sensor bias errors nor the temperature coefficients of the operating configurations are assumed to be equal; instead, each operating configuration of the sensor is assumed to have its own unique bias and thermal sensitivity. With this starting point, the differential output signal is now:

$$V_{diff} = \frac{V_P - V_N}{2} = V_{Rate} + \frac{V_{Bp} - V_{Bn}}{2} + \frac{(k_{Bp} - k_{Bn})T}{2} \qquad \text{Eq. 5.2}$$

In this more complete model, there is a term remaining that corresponds to a sensor bias error, which is the difference between the bias of the two operating configurations, and a term remaining that corresponds to a temperature coefficient, which is the difference between the temperature coefficients of the two operating configurations.

If we define $V_{BD}$ (the differential bias error of the angular-rate sensor) as:

$$V_{BD} = \frac{V_{Bp} - V_{Bn}}{2} \qquad \text{Eq. 5.3}$$

and we define $k_{BD}$ (the differential thermal coefficient) as:

$$k_{BD} = \frac{k_{Bp} - k_{Bn}}{2} \qquad \text{Eq. 5.4}$$

then Eq. 5.2 becomes:

$$V_{diff} = V_{Rate} + V_{BD} + k_{BD}T \qquad \text{Eq. 5.6}$$

Figure 17A:
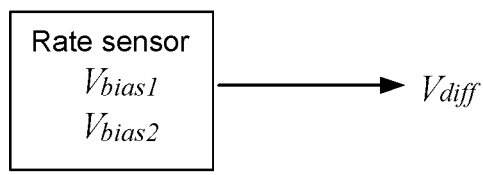
FIG. 17A, which illustrates features of calibration for purposes of minimizing errors across a range of temperatures.

A benefit of our configuration-changing angular-rate sensor is that these remaining error terms can be substantially reduced by calibrating the sensor. Calibration is the practice of setting operating parameters of the sensor such that the sensor output variation over an operating range is minimized. For example, a correction voltage $V_{bias1}$ may be established for the first operating configuration so as to minimize error due to temperature over an expected range of operating temperatures. Similarly, a correction voltage $V_{bias2}$ may be established for the second operating configuration (initial or alternative) so as to minimize error due to temperature over an expected range of operating temperatures. If only calibration is utilized, then during operation the actual temperature is not used in determining whether to correct for errors. Instead, the correction voltages $V_{bias1}$ and $V_{bias2}$ are applied prior to providing $V_{diff}$ regardless of the temperature at which the sensor operates. FIG. 17A diagrammatically depicts calibration in which two bias voltages, one for each of two operating configurations) are used to minimize the variation of Vdiff over a temperature range.

Figure 17B:
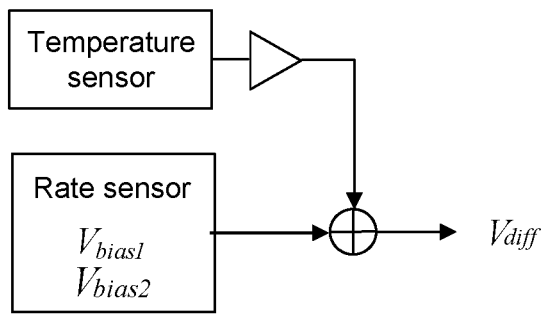
FIG. 17B, which illustrates features of compensation for purposes of minimizing errors at a particular temperature.

Alternatively or in addition to calibrating the sensor, error reduction may be accomplished with compensation. Compensation occurs when a correction to the output signal is applied as a function of a measured parameter, such as sensor temperature. FIG. 17B illustrates an arrangement for effecting compensation. For example, correction voltages $V_{bias1}$ and $V_{bias2}$ may each be selected from a range of voltages, depending on the temperature of the sensor. In the example shown in FIG. 17B, the bias correction voltages $V_{bias1}$ and $V_{bias2}$ are selected in order to minimize the variation of the differential sensor output ($V_{diff}$) that is known to exist at a particular temperature. In this document, a detailed discussion of compensation techniques is not provided, but a calibration technique is described below.

Calibration of the Sensor

Figure 18:
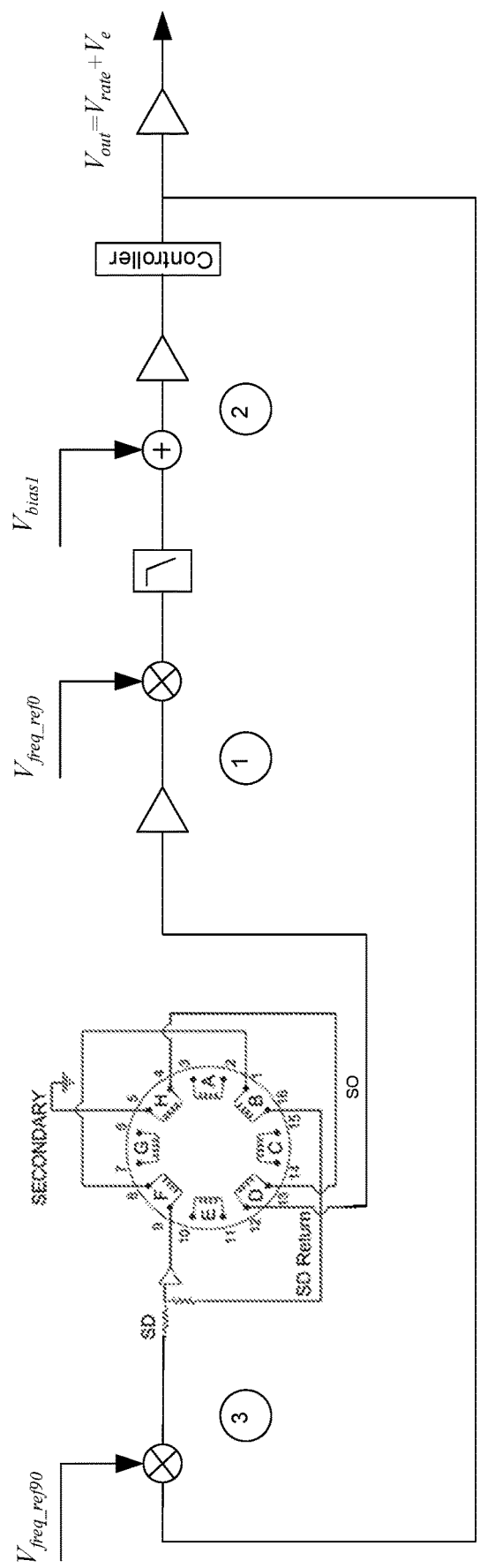
FIG. 18, which schematically depicts a system having feedback control of the angular rate sensor configured according to FIG. 8B.

With reference to FIG. 18, calibration of the sensor is explained with reference to operation of the sensor secondary-control-loop. The voltage output of the amplifier at point 1, is a sinusoidal signal proportional to the secondary ring oscillation $r_S$. This signal is demodulated to generate a DC voltage that, at point 2, is proportional to the amplitude of the signal at point 1. After processing by an integrator, which may be part of the controller, the circuit returns a signal to point 3 that has been modulated back up to the operating frequency. This signal results in a force on the ring that controls the amplitude of the ring's radial oscillation. The sensor may be calibrated by applying the bias correction voltage $V_{bias1}$ at point 2. Conventionally, the bias correction voltage is set so that the output rate signal $V_{out}$ is zero when there is no externally applied rate. By doing so, the applied bias correction voltage substantially offsets the error $V_e$, and thus $V_{out}$ of the sensor will have less offset error. By calibrating the system, the voltage at point 3 is applied with a known and intentional bias so as to cancel the bias that is expected to be introduced by the sensor. As a result, the signal at point 2 has little or no bias error, and so the error going into the integrator is at, or near zero.

Calibration of the Configuration-Changing Angular-rate Sensor

A primary goal of the bias correction voltage that is used for calibration purposes is to change the offset of the sensor output signal. A secondary goal is to change the thermal coefficient of the sensor. The effect of this secondary goal is small compared to the offset change. But, for our configuration-changing sensor, the effect of this secondary goal can greatly improve the thermal stability of the sensor.

Figure 19:
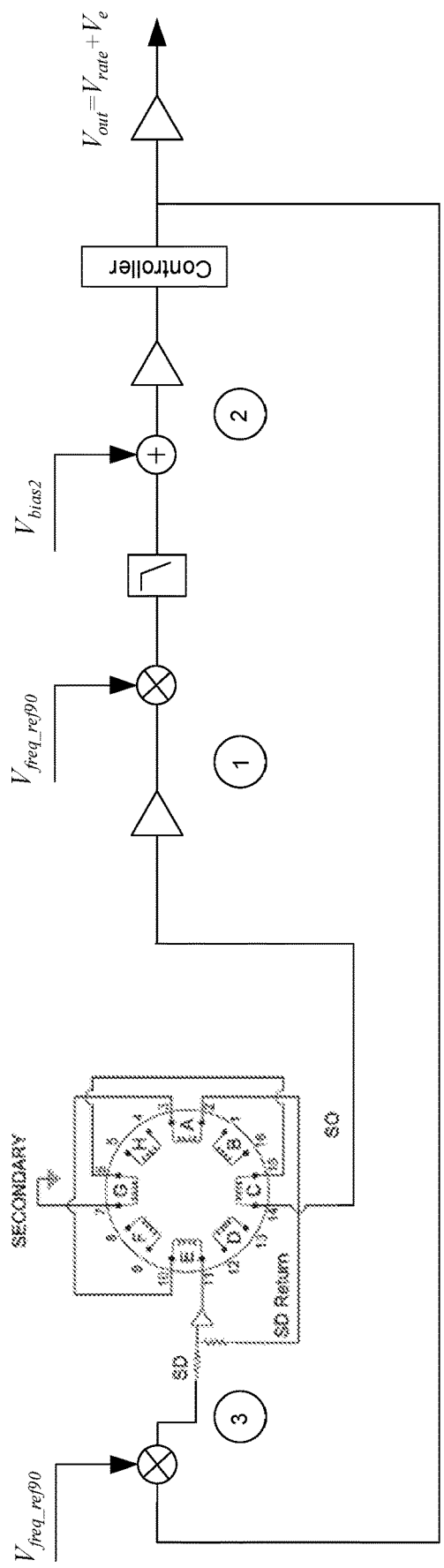
FIG. 19, which schematically depicts a system having feedback control of the angular rate sensor configured according to FIG. 9B.

In a manner similar to the sensor in the first operating configuration, the sensor in the second operating configuration may also have a bias correction voltage $V_{bias2}$. $V_{bias2}$ may be applied to the secondary control loop—see FIG. 19. So, for the two operating configurations, $V_{bias1}$ is the correction voltage used during the first operating configuration, and $V_{bias2}$ is the correction voltage used during the second operating configuration.

A goal of the calibration procedure for the configuration-changing angular-rate sensor is to eliminate the thermal coefficient ($k_{BD}$) of the sensor. Another way to say this is that calibration seeks to make (but may not truly achieve) the response of the sensor less variable over a range of temperatures. Data corresponding to a calibration procedure executed on a rate sensor is shown in Table A below. A rate sensor in keeping with our invention was tested in three configurations: Case 1, Case 2, and Case 3. In these cases, $V_{bias1}$ (see FIG. 18) was held at a constant value, and $V_{bias2}$ (see FIG. 19) was varied incrementally ("Δ"). The thermal coefficient, $k_{BD}$, was determined from the resulting test data using Equation 7.1:

$$k_{BD} = \frac{\Delta V_{diff}}{\Delta T} \qquad \text{Eq. 7.1}$$

The right-most column of the table shows the calculated thermal coefficient, $k_{BD}$. In this example, the output temperature slope is nearest zero in Case 2, and therefore Case 2 has the best thermal stability. As such, this particular sensor would be calibrated to have a temperature coefficient of 0.1°/hr/° C.

TABLE A

|  | Bias voltage | Bias voltage | Output temp slope $k_{Bp}$-$k_{Bn}$ (°/hr/° C.) |
|---|---|---|---|
| Case 1 | $V_{bias1}$ | $V_{bias2}$ | 0.3 |
| Case 2 | $V_{bias1}$ | $V_{bias2} + \Delta$ | 0.1 |
| Case 3 | $V_{bias1}$ | $V_{bias2} + 2\Delta$ | -0.2 |

To obtain a more accurate result, it is possible to vary both $V_{bias1}$ and $V_{bias2}$ incrementally, and thereby provide additional cases from which to select that combination of $V_{bias1}$ and $V_{bias2}$ that produces a calculated thermal coefficient ($k_{BD}$) that is closest to zero.

Figure 20:
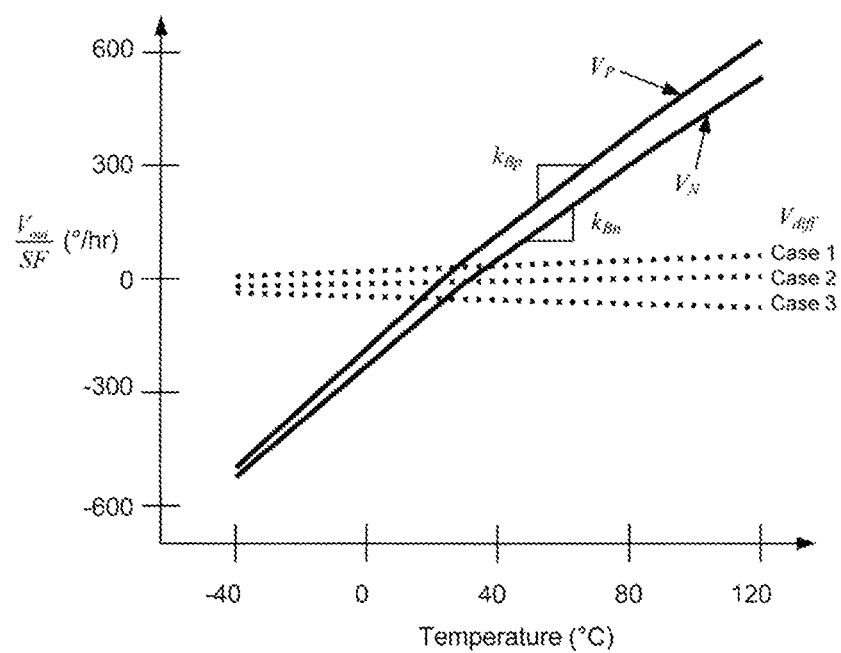
FIG. 20, which plots the sensor output when operating in the first operating configuration ($V_P$) and the sensor output when operating in the second operating configuration ($V_N$) normalized to degrees per hour versus temperature (degrees C.), and shows the slope $k_{Bp}$ of the output signal $V_P$ for the first operating configuration, and shows the slope $k_{Bn}$ of the output signal $V_N$ for the second operating configuration of an angular rate sensor, as well as the difference (Vdiff) between those $k_B$ values for three cases having different calibrations of the angular rate sensor.

Keeping in mind the three cases of Table A, the effect of the bias correction voltages over temperature is further explained with reference to FIG. 20. The vertical axis is a value corresponding to a normalized output ($V_{out}$ divided by a scale factor). FIG. 20 shows the output voltages $V_P$ and $V_N$ of the sensor for the first and second operating configurations, respectively. FIG. 20 also shows the differential output $V_{diff}$ for three different cases. Over the temperature range of the test, the output signals, $V_P$ and $V_N$, of the two operating configurations of the sensor vary by ±600°/hr, but the differential signal ($V_P$ minus $V_N$) varies by a fraction of this amount. By using the bias correction settings of Case 2, the output signal of the angular rate sensor varies over the temperature range −40 C to +120 C by only ±2°/hr, and so the thermal stability of the sensor was significantly improved by calibrating the sensor. Another way to understand calibration of the sensor is to consider that the bias correction voltages are adjusted so that the two operating configurations, Vp and Vn, have the same variation over temperature.

Figure 21:
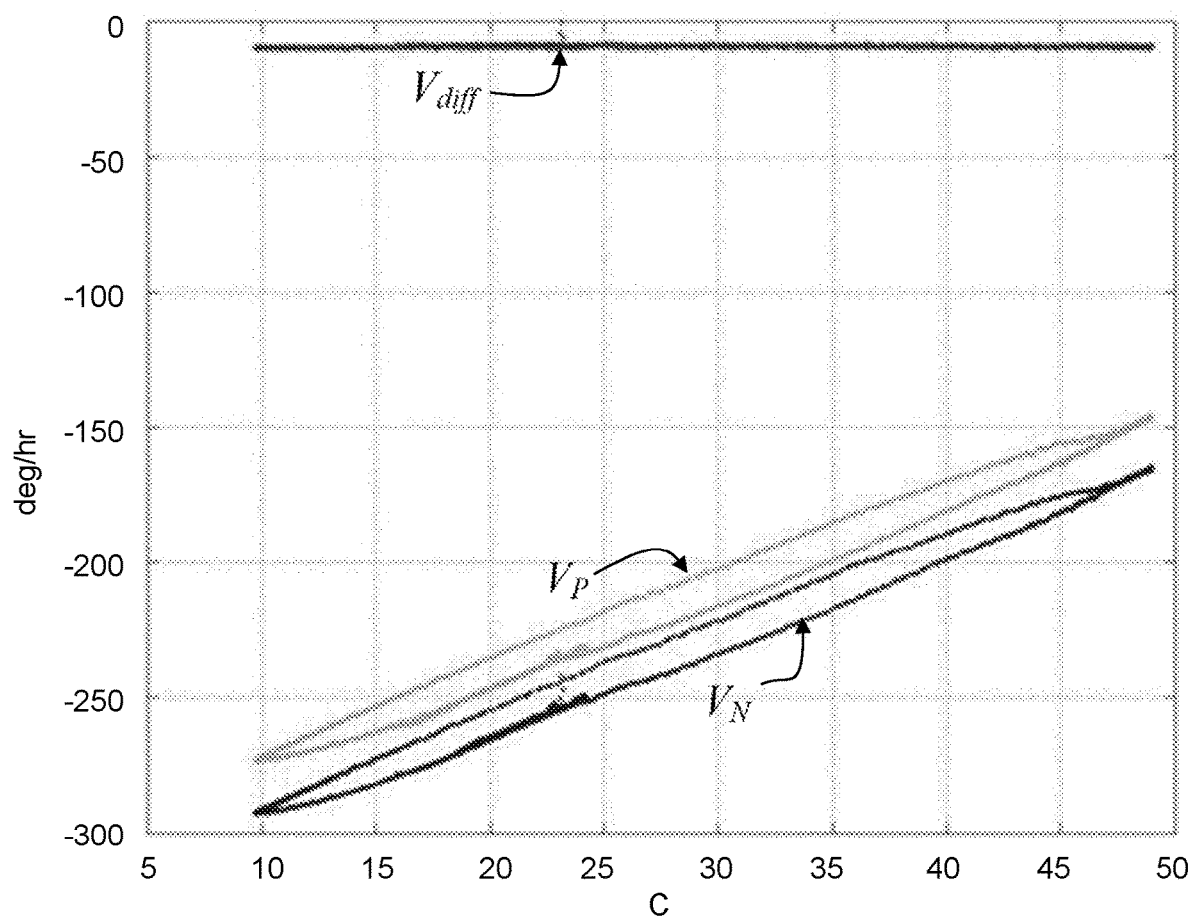
FIG. 21, which plots the sensor output ($V_P$ and $V_N$) normalized to degrees per hour versus temperature (degrees C.) for the first operating configuration and the second operating configuration, as well as the difference (Vdiff) between $V_P$ and $V_N$.

Test results for a calibrated angular rate sensor are shown in FIG. 21. The bias value has been chosen to minimize the variation of $V_{diff}$ over temperature. The output of the two operating configurations ($V_P$ and $V_N$) vary by 125°/hr over the temperature range of 10 C to 50 C, while the differential voltage varies by about 1°/hr over the same temperature range. So, the test data depicted in FIG. 21 show that the differential sensor has a two-order-of-magnitude improvement in bias stability over the standard sensor.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An angular rate sensor, comprising:
   a ring;
   a plurality of sensor-drivers, each sensor-driver having a component that moves with the ring, wherein the sensor-drivers are arranged in cooperating sets, and each cooperating set has two sensor-drivers positioned 180° apart;
   circuitry which can selectively engage some of the cooperating sets as sensors and others of the cooperating sets as drivers;
   a controller that:
      (a) during a first period of time ("fpt"):
         (i) engages a first of the cooperating sets to radially apply forces to the ring in order to cause the ring to vibrate at a natural frequency that would establish at least four node locations in the absence of angular motion, each node location being a location at which the vibrating ring does not move radially in the absence of angular motion;
         (ii) engages a second of the cooperating sets to sense radial movement of the ring caused by the first cooperating set radially driving the ring;
         (iii) engages a third of the cooperating sets to sense radial movement of the ring at a first two of the node locations;
         (iv) engages a fourth of the cooperating sets to radially apply forces to the ring in order to reduce motion detected by the third cooperating set;
      (b) during a second period of time ("spt"):
         (i) engages either the third cooperating set or the first cooperating set to radially apply forces to the ring in order to cause the ring to vibrate at the natural frequency;
         (ii) engages either the fourth cooperating set (if the third cooperating set is engaged under (b)(i) above) or the second cooperating set (if the first cooperating set is engaged under (b)(i) above) to sense radial movement of the ring caused by the third or first cooperating set (as the case may be) radially driving the ring;
         (iii) engages either the second cooperating set (if the third cooperating set is engaged under (b)(i) above) or the fourth cooperating set (if the first cooperating set is engaged under (b)(i) above) to sense radial movement of the ring at two of the node locations;
         (iv) engages either the first cooperating set (if the third cooperating set is engaged under (b)(i) above) or the third cooperating set (if the first cooperating set is engaged under (b)(i) above) to radially apply forces to the ring in order to reduce motion detected by the second cooperating set (if the third cooperating set is engaged under (b)(i) above) or the fourth cooperating set (if the first cooperating set is engaged under (b)(i) above), as the case may be; and
   an energy sensor in communication with the cooperating sets, and that determines an fpt energy value and an spt energy value, the fpt energy value being measured by the fourth cooperating set, and the spt energy value being measured by the first cooperating set (if the third cooperating set is engaged under (b)(i) above) or the third cooperating set (if the first cooperating set is engaged under (b)(i) above);
   an output signal generator in communication with the energy sensor, and that determines an energy difference between the fpt energy value and the spt energy value, and identifies an angular rate of rotation corresponding to the energy difference.

2. The angular rate sensor of claim 1, wherein:
   during the spt, the controller:
      (i) engages the third cooperating set under step (b)(i);
      (ii) engages the fourth cooperating set under step (b)(ii);
      (iii) engages the second cooperating set under step (b)(iii);
      (iv) engages the first cooperating set under step (b)(iv); and
   between the fpt and the spt, the controller connects the first cooperating set to a ground-reference voltage so that radial movement of the ring is reduced.

3. The angular rate sensor of claim 2, wherein at least some of the sensor-drivers are capacitors.

4. The angular rate sensor of claim 2, wherein at least some of the sensor-drivers include a piezo-electric material.

5. The angular rate sensor of claim 2, wherein at least some of the sensor-drivers are inductors.

6. The angular rate sensor of claim 2, wherein (a) the first cooperating set and the second cooperating set are positioned with regard to the ring in order to be offset from each other by 90°, and (b) the third cooperating set and the fourth cooperating set are positioned with regard to the ring in order to be offset from each other by 90°, and (c) the first cooperating set and the fourth cooperating set are positioned with regard to the ring in order to be offset from each other by 45°.

7. The angular rate sensor of claim 2, wherein an output signal produced by the second cooperating set during the fpt is adjusted by a bias correction voltage.

8. The angular rate sensor of claim 2, wherein an output signal produced by the fourth cooperating set during the spt is adjusted by a bias correction voltage.

9. The angular rate sensor of claim 1, wherein during the fpt the fourth cooperating set applies forces to the ring at locations where a second two of the nodes should be if no angular motion is present.

10. The angular rate sensor of claim 1, wherein during the spt the cooperating set engaged in (b)(iv) applies forces to the ring at locations where a second two of the nodes should be if no angular motion is present.

11. The angular rate sensor of claim 1, wherein an output signal produced by the second cooperating set during the fpt is adjusted by a bias correction voltage.

12. The angular rate sensor of claim 11, wherein the bias correction voltage is selected to be equal to a voltage which causes the energy difference to be equal to zero when no externally applied rate is applied to the sensor.

13. The angular rate sensor of claim 1, wherein an output signal produced by the fourth cooperating set during the spt is adjusted by a bias correction voltage.

14. The angular rate sensor of claim 13, wherein the bias correction voltage is selected to be equal to a voltage which causes the energy difference to be equal to zero when no externally applied rate is applied to the sensor.

15. The angular rate sensor of claim 1, wherein during the spt, the controller:
(i) engages the first cooperating set under step (b)(i);
(ii) engages the second cooperating set under step (b)(ii);
(iii) engages the fourth cooperating set under step (b)(iii);
(iv) engages the third cooperating set under step (b)(iv).

16. The angular rate sensor of claim 15, wherein at least some of the sensor-drivers are capacitors.

17. The angular rate sensor of claim 15, wherein at least some of the sensor-drivers include a piezo-electric material.

18. The angular rate sensor of claim 15, wherein at least some of the sensor-drivers are inductors.

19. The angular rate sensor of claim 15, wherein the first cooperating set and the second cooperating set are disposed on the ring to be offset from each other by 90°, and the third cooperating set and the fourth cooperating set are disposed on the ring to be offset from each other by 90°, and the first cooperating set and the fourth cooperating set are disposed on the ring to be offset from each other by 45°.

20. The angular rate sensor of claim 15, wherein an output signal produced by the second cooperating set during the fpt is adjusted by a bias correction voltage.

21. The angular rate sensor of claim 20, wherein the bias correction voltage is selected to be equal to a voltage which causes the energy difference to be equal to zero when no externally applied rate is applied to the sensor.

22. The angular rate sensor of claim 15, wherein an output signal produced by the second cooperating set during the spt is adjusted by a bias correction voltage.

23. The angular rate sensor of claim 22, wherein the bias correction voltage is selected to be equal to a voltage which causes the energy difference to be equal to zero when no externally applied rate is applied to the sensor.

24. The angular rate sensor of claim 1, wherein the energy values are each a voltage.

25. The angular rate sensor of claim 1, wherein the output signal generator determines an energy difference by subtracting the spt energy value from the fpt energy value.

26. The angular rate sensor of claim 1, wherein the output signal generator determines an energy difference by subtracting the fpt energy value from the spt energy value.

27. A method of determining angular rate, comprising:
providing an angular rate sensor having:
a ring;
a plurality of sensor-drivers, each sensor-driver having a component that moves with the ring wherein the sensor-drivers are arranged in cooperating sets, and each cooperating set has two sensor-drivers positioned 180° apart;
circuitry which can selectively engage some of the cooperating sets as sensors and others of the cooperating sets as drivers;
a controller in communication with the circuitry, and that engages some of the sensor-drivers to sense radial movement of the ring and some of the sensor-drivers to apply forces to the ring;
an energy sensor in communication with the sensor-drivers via the circuitry, and that determines energy values using selected ones of the sensor-drivers; and
an output signal generator in communication with the energy sensor;
using the controller,
(a) during a first period of time ("fpt"):
(i) engaging a first of the cooperating sets to radially apply forces to the ring in order to cause the ring to vibrate at a natural frequency that would establish at least four node locations in the absence of angular motion, each node location being a location at which the vibrating ring does not move radially in the absence of angular motion;
(ii) engaging a second of the cooperating sets to sense radial movement of the ring caused by the first cooperating set radially driving the ring;
(iii) engaging a third of the cooperating sets to sense radial movement of the ring at a first two of the node locations;
(iv) engaging a fourth of the cooperating sets to radially apply forces to the ring in order to reduce motion detected by the third cooperating set;
(b) during a second period of time ("spt"):
(i) engaging either the third cooperating set or the first cooperating set to radially apply forces to the ring in order to cause the ring to vibrate at the natural frequency;
(ii) engaging either the fourth cooperating set (if the third cooperating set is engaged under (b)(i) above) or the second cooperating set (if the first cooperating set is engaged under (b)(i) above) to sense radial movement of the ring caused by the third or first cooperating set (as the case may be) radially driving the ring;
(iii) engaging either the second cooperating set (if the third cooperating set is engaged under (b)(i)

above) or the fourth cooperating set (if the first cooperating set is engaged under (b)(i) above) to sense radial movement of the ring at two of the node locations;

(iv) engaging either the first cooperating set (if the third cooperating set is engaged under (b)(i) above) or the third cooperating set (if the first cooperating set is engaged under (b)(i) above) to radially apply forces to the ring in order to reduce motion detected by the second cooperating set (if the third cooperating set is engaged under (b)(i) above) or the fourth cooperating set (if the first cooperating set is engaged under (b)(i) above), as the case may be; and using the energy sensor, determining an fpt energy value and an spt energy value, the fpt energy value being measured by the fourth cooperating set, and the spt energy value being measured by the first cooperating set (if the third cooperating set is engaged under (b)(i) above) or the third cooperating set (if the first cooperating set is engaged under (b)(i) above);

using the output signal generator, determining an energy difference between the fpt energy value and the spt energy value, and identifying an angular rate of rotation corresponding to the energy difference.

28. The method of claim 27, wherein:

during the spt, the controller:
(i) engages the third cooperating set under step (b)(i);
(ii) engages the fourth cooperating set under step (b)(ii);
(iii) engages the second cooperating set under step (b)(iii);
(iv) engages the first cooperating set under step (b)(iv); and between the fpt and the spt, the controller connects the first cooperating set to a ground-reference voltage so that radial movement of the ring is reduced.

29. The method of claim 28, wherein at least some of the sensor-drivers are capacitors.

30. The method of claim 28, wherein at least some of the sensor-drivers include a piezo-electric material.

31. The method of claim 28, wherein at least some of the sensor-drivers are inductors.

32. The method of claim 28, wherein the first cooperating set and the second cooperating set are positioned with regard to the ring in order to be offset from each other by 90°, and the third cooperating set and the fourth cooperating set are positioned with regard to the ring in order to be offset from each other by 90°, and the first cooperating set and the fourth cooperating set are positioned with regard to the ring in order to be offset from each other by 45°.

33. The method of claim 28, wherein an output signal produced by the second cooperating set during the fpt is adjusted by a bias correction voltage.

34. The method of claim 28, wherein an output signal produced by the fourth cooperating set during the spt is adjusted by a bias correction voltage.

35. The method of claim 27, wherein during the fpt the fourth cooperating set applies forces to the ring at locations where a second two of the nodes should be if no angular motion is present.

36. The method of claim 27, wherein during the spt the cooperating set engaged in step (b)(iv) applies forces to the ring at locations where a second two of the nodes should be if no angular motion is present.

37. The method of claim 27, wherein an output signal produced by the second cooperating set during the fpt is adjusted by a bias correction voltage.

38. The method of claim 37, wherein the bias correction voltage is selected to be equal to a voltage which causes the energy difference to be equal to zero when no externally applied rate is applied to the sensor.

39. The method of claim 27, wherein an output signal produced by the fourth cooperating set during the spt is adjusted by a bias correction voltage.

40. The method of claim 39, wherein the bias correction voltage is selected to be equal to a voltage which causes the energy difference to be equal to zero when no externally applied rate is applied to the sensor.

41. The method of claim 27, wherein during the spt, the controller:
(i) engages the first cooperating set under step (b)(i);
(ii) engages the second cooperating set under step (b)(ii);
(iii) engages the fourth cooperating set under step (b)(iii);
(iv) engages the third cooperating set under step (b)(iv).

42. The method of claim 41, wherein at least some of the sensor-drivers are capacitors.

43. The method of claim 41, wherein at least some of the sensor-drivers include a piezo-electric material.

44. The method of claim 41, wherein at least some of the sensor-drivers are inductors.

45. The method of claim 41, wherein the first cooperating set and the second cooperating set are disposed on the ring to be offset from each other by 90°, and the third cooperating set and the fourth cooperating set are disposed on the ring to be offset from each other by 90°, and the first cooperating set and the fourth cooperating set are disposed on the ring to be offset from each other by 45°.

46. The method of claim 41, wherein an output signal produced by the second cooperating set during the fpt is adjusted by a bias correction voltage.

47. The method of claim 46, wherein the bias correction voltage is selected to be equal to a voltage which causes the energy difference to be equal to zero when no externally applied rate is applied to the sensor.

48. The method of claim 41, wherein an output signal produced by the second cooperating set during the spt is adjusted by a bias correction voltage.

49. The method of claim 48, wherein the bias correction voltage is selected to be equal to a voltage which causes the energy difference to be equal to zero when no externally applied rate is applied to the sensor.

50. The method of claim 27, wherein the energy values are each a voltage.

51. The method of claim 27, wherein the output signal generator determines an energy difference by subtracting the spt energy value from the fpt energy value.

52. The method of claim 27, wherein the output signal generator determines an energy difference by subtracting the fpt energy value from the spt energy value.

* * * * *